Inventor
HERBERT A. SILVEN
By Harold W. Eaton
Attorney

Aug. 4, 1953     H. A. SILVEN     2,647,349
GRINDING MACHINE

Original Filed Aug. 4, 1951     15 Sheets-Sheet 7

Inventor
HERBERT A SILVEN

By Harold W. Eaton
Attorney

Aug. 4, 1953   H. A. SILVEN   2,647,349
GRINDING MACHINE
Original Filed Aug. 4, 1951   15 Sheets-Sheet 8

Inventor
HERBERT A SILVEN

By Harold W. Eaton
Attorney

Inventor
HERBERT A. SILVEN

By Harold W. Eaton
Attorney

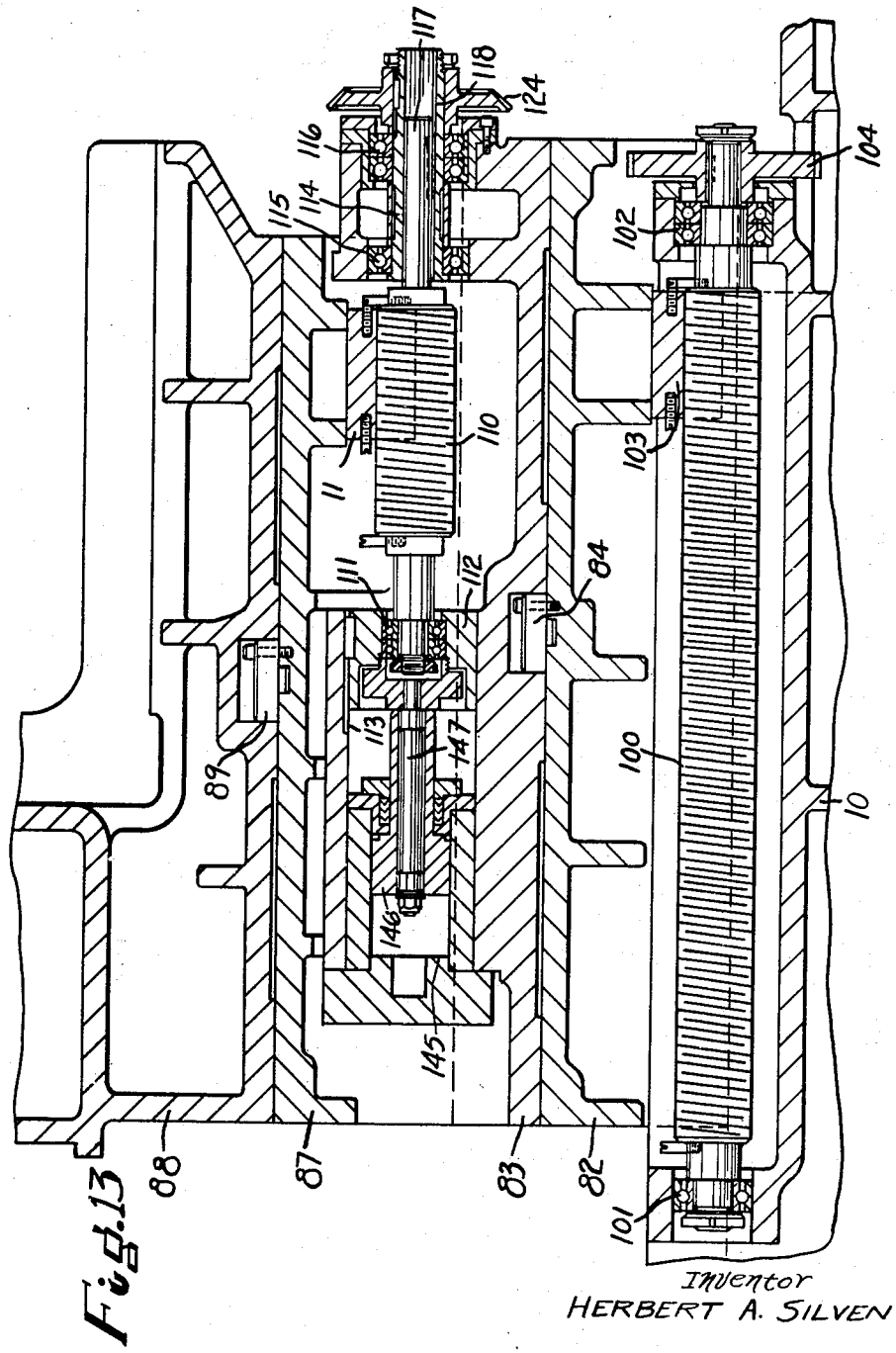

Aug. 4, 1953  H. A. SILVEN  2,647,349
GRINDING MACHINE
Original Filed Aug. 4, 1951  15 Sheets-Sheet 11
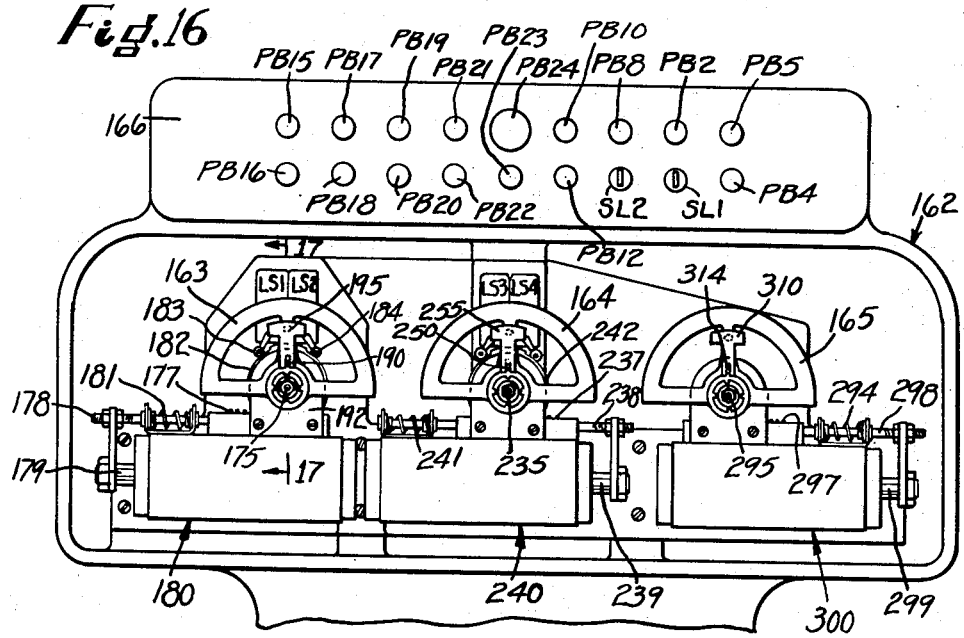
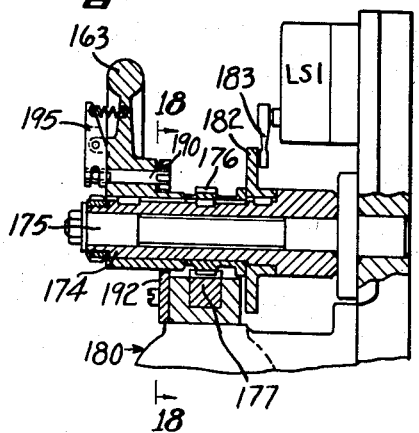
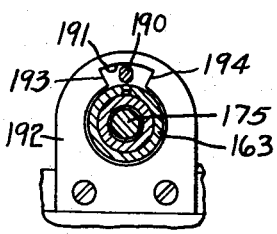
*Inventor*
HERBERT A. SILVEN
By Harold W. Eaton
*Attorney*

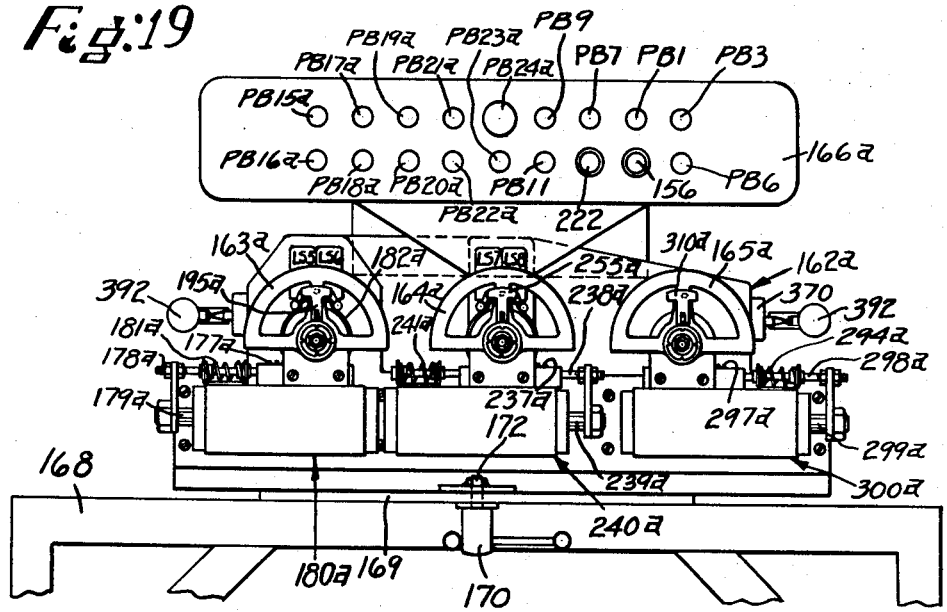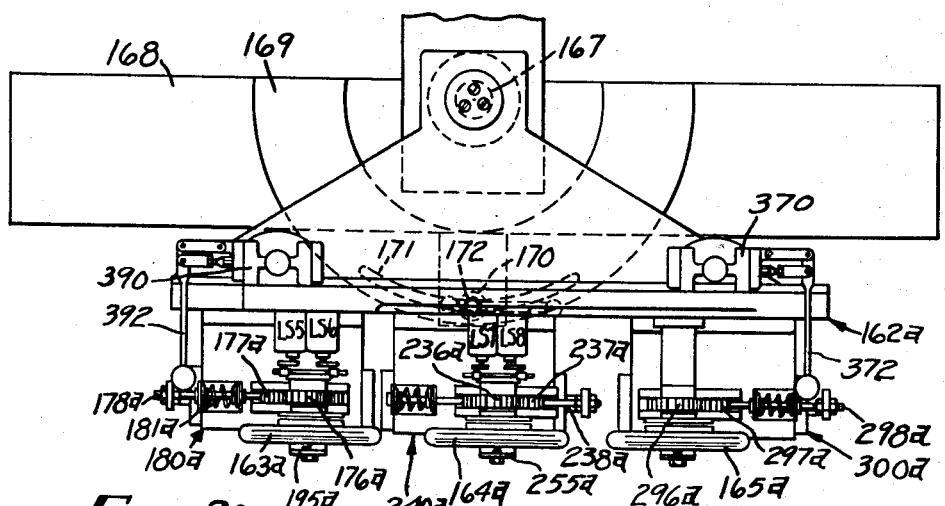

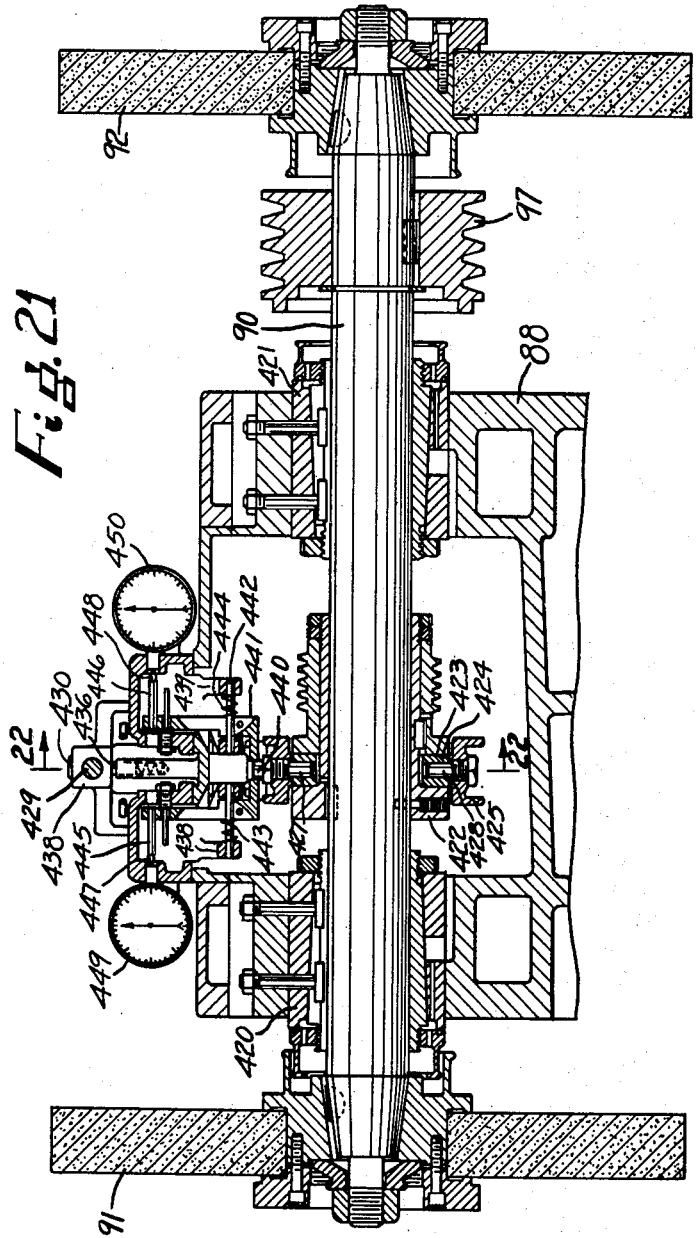

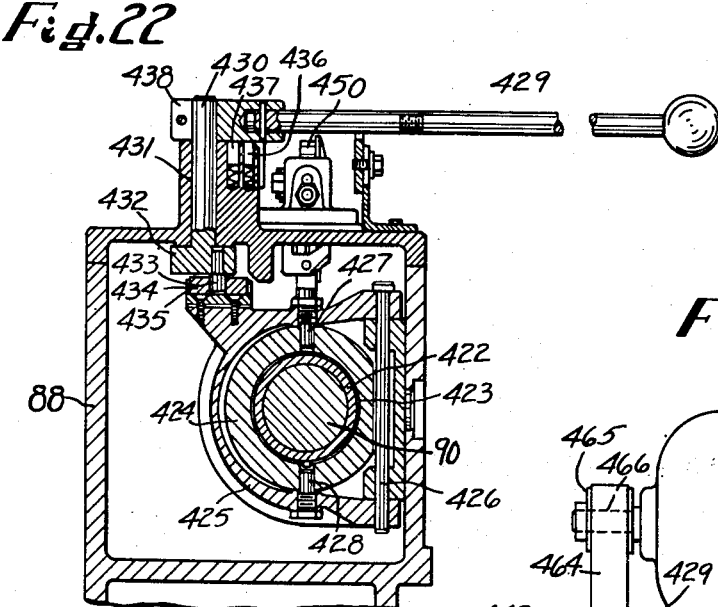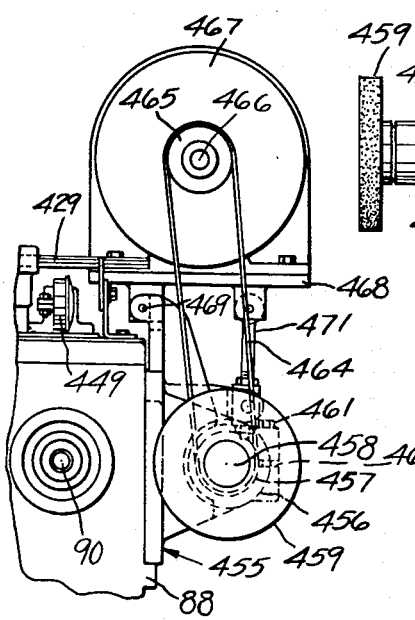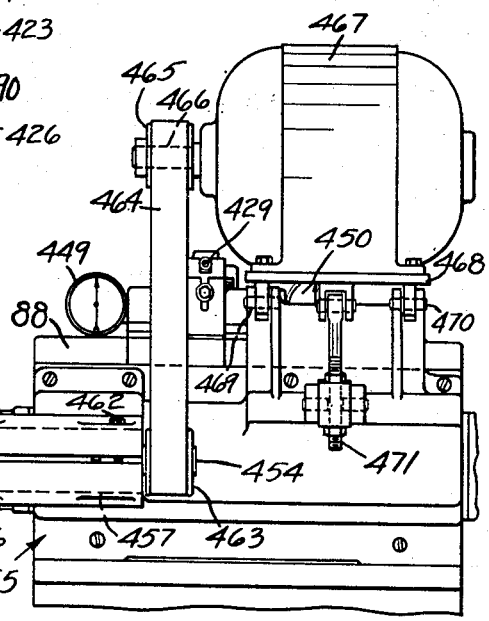

Aug. 4, 1953     H. A. SILVEN     2,647,349
GRINDING MACHINE
Original Filed Aug. 4, 1951     15 Sheets-Sheet 15
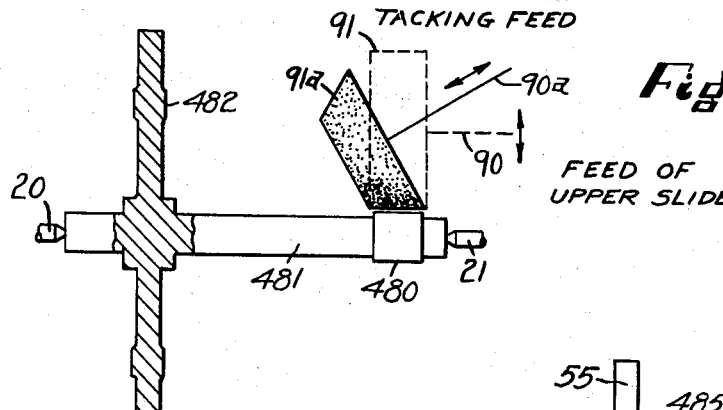
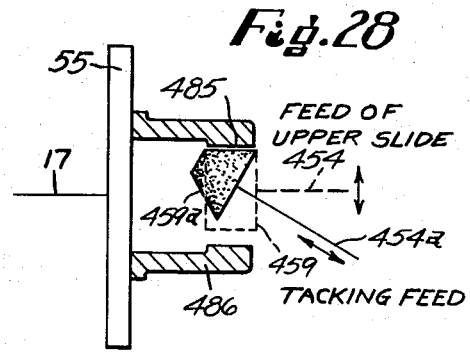
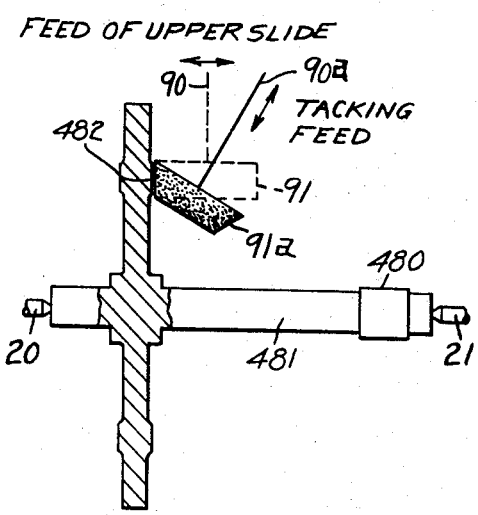
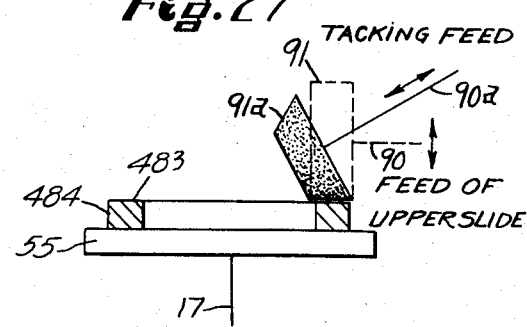
Inventor
HERBERT A. SILVEN
By Harold W. Eaton
Attorney Patented Aug. 4, 1953

2,647,349

UNITED STATES PATENT OFFICE 2,647,349

GRINDING MACHINE

Herbert A. Silven, Worcester, Mass., assignor to Norton Company, Worcester, Mass., a corporation of Massachusetts Original application August 4, 1951, Serial No. 240,378. Divided and this application June 19, 1952, Serial No. 294,311

4 Claims. (Cl. 51—166)

The invention relates to grinding machines, and more particularly to a universal-type grinding machine. This application is a division of my co-pending application, Serial No. 240,378 filed August 4, 1951.

One object of the invention is to provide a simple and thoroughly practical grinding machine for grinding or regrinding a wide variety of workpieces. Another object is to provide a grinding machine whereby workpieces may be ground either on centers or may be ground while mounted on a face plate. Another object is to provide a double swivel wheel head whereby a wide variety of angular surfaces on a workpiece may be ground.

A further object of the invention is to provide hydraulically actuated grinding wheel carriage and grinding wheel slides with hydraulically actuated nut and screw mechanism for traversing the carriage to position the grinding wheel relative to the work to be ground, and also to feed the grinding wheel transversely to grind the workpiece to the desired and predetermined extent. Another object is to provide a hydraulically actuated electrically controlled mechanism for remotely controlling the positioning movement of the grinding wheel carriage. Another object is to provide a hydraulically actuated electrically controlled mechanism independently to feed both of the cross slides by a remote control thereof. Another object is to provide independent manually operable remote control mechanisms for the grinding wheel carriage traversing mechanism and for both an upper and lower cross slide feeding mechanisms in which there is no mechanical connection between the control mechanism and the actuating mechanism therefor whereby the carriage and slides may be precisely adjusted during a grinding operation. A further object is to provide a tacking-type feed mechanism whereby an angularly arranged wheel spindle may be manually adjusted axially to impart a precise transverse feeding movement of the grinding wheel. Other objects will be in part obvious or in part pointed out hereinafter.

The invention accordingly consists in the features of construction, arrangements of parts, as will be exemplified in the structure to be hereinafter described, and the scope of the application of which will be indicated in the following claims.

One embodiment of the invention has been illustrated in the drawings, in which:

Fig. 13 is a fragmentary vertical sectional view, on an enlarged scale, through the nut and screw feed mechanism for the upper and lower slides;

Fig. 14 is a fragmentray detail view, on an enlarged scale, of the fine adjusting mechanism for controlling the swivelling movement of the upper slide and its supporting slide;

Fig. 15 is a vertical sectional view, taken approximately on the line 15—15 of Fig. 14;

Fig. 16 is a fragmentary front elevation, on an enlarged scale, of the lower control station on the front of the machine, having the cover removed so as to show the control valves;

Fig. 17 is a fragmentary vertical sectional view, taken approximately on the line 17—17 of Fig. 16, through the manual control for the upper slide;

Fig. 18 is a fragmentary sectional view, taken approximately on the line 18—18 of Fig. 17;

Fig. 19 is a fragmentary front elevation, on an enlarged scale, of the upper control station on the longitudinally movable carriage, having the casing removed to show the control valves;

Fig. 20 is a plan view of the upper control station as shown in Fig. 19;

Fig. 21 is a vertical sectional view, on an enlarged scale, through the grinding wheel head, showing the wheel spindle positioning mechanism;

Fig. 22 is a vertical sectional view, taken approximately on the line 22—22 of Fig. 21, through the wheel spindle actuating mechanism;

Fig. 23 is a front elevation of an internal grinding attachment removably mounted on the front of the wheel head;

Fig. 24 is a left-hand end elevation of the internal grinding attachment as shown in Fig. 23;

Fig. 25 is a diagrammatic view showing the grinding machine set-up to employ a tacking feed;

Fig. 26 is a diagrammatic view showing the grinding machine set-up for a shoulder or side face grinding operation;

Fig. 27 is a diagrammatic view showing the grinding machine set-up for a surface grinding operation; and Fig. 28 is a diagrammatic view showing the grinding machine set-up for an internal grinding operation.

Figure 1:
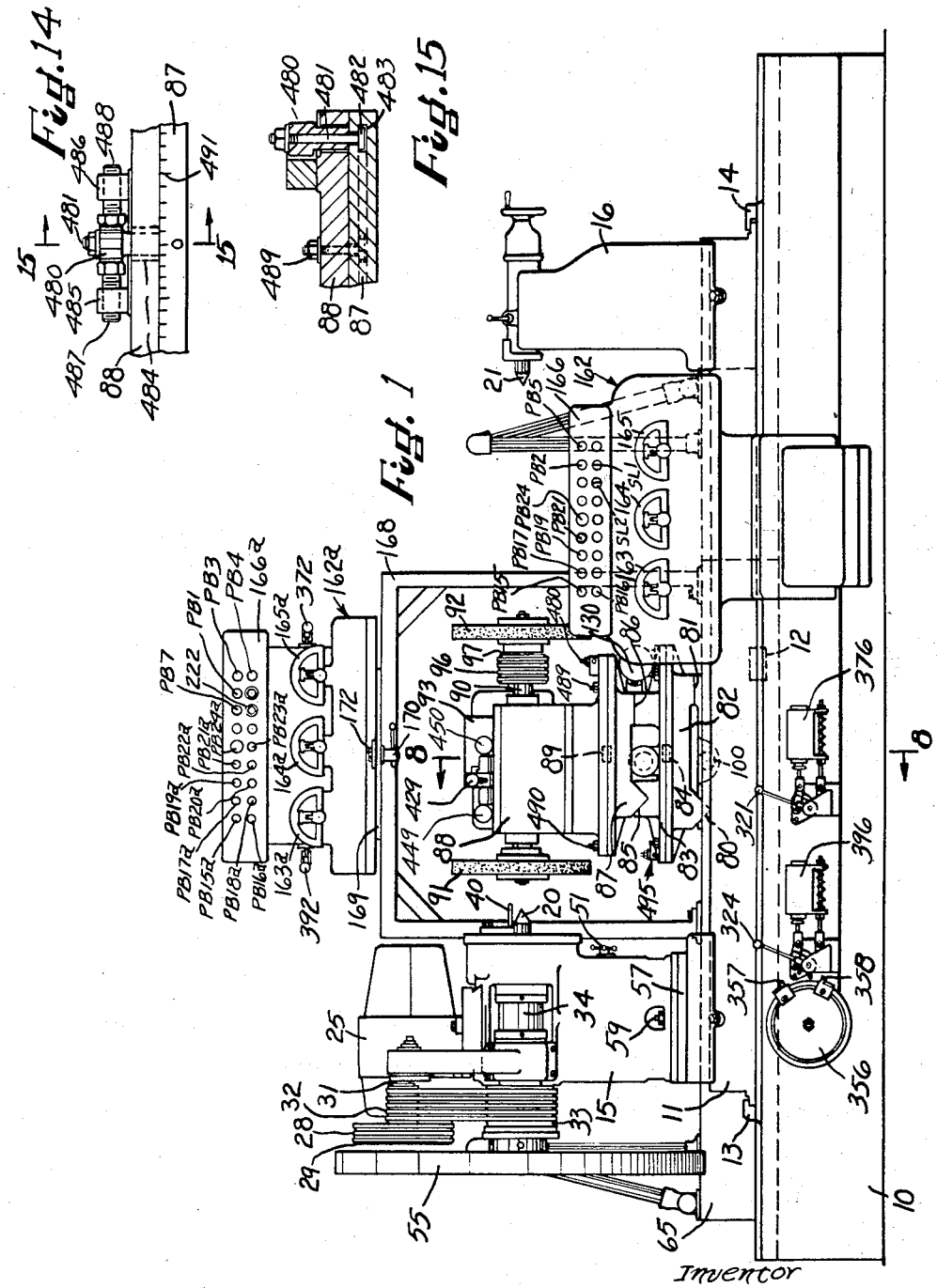
Fig. 1 is a front elevation of the improved grinding machine.

The improved grinding machine has been illustrated in the drawings comprising a base 10 which supports a swivel table 11. The swivel table 11 is arranged to pivot on a stud 12 which is fixedly supported on the base 10. A pair of guides and clamping blocks 13 and 14 are provided on the base 10 for engaging and clamping opposite ends of the swivel table 11 in adjusted position to the base 10.

The swivel table 11 serves as a support for a headstock 15 and a footstock 16 for rotatably supporting a workpiece during a grinding operation.

The headstock 15 is provided with a rotatable headstock spindle 17 which is journalled in anti-friction bearings 18 and 19 within the headstock 15. The headstock spindle 17 is provided with a headstock center 20 for rotatably supporting the left-hand end of a workpiece. The footstock 16 is similarly provided with a footstock center 21 for rotatably supporting the right-hand end of a workpiece during a grinding operation.

A suitable driving mechanism is provided for the headstock spindle comprising an electric motor 25 mounted on top of the headstock 15. The motor 25 is provided with an armature shaft 26 having a multiple V-groove pulley 27 which is connected by multiple V-belts 28 with a pulley 29 mounted on a shaft 30. The shaft 30 also supports a multiple V-groove pulley 31 which is connected by multiple V-belts 32 with a multiple V-groove pulley 33 mounted on a rotatable shaft 34. The shaft 34 is connected by means of a sprocket and link chain (not shown) with a sprocket 37 which is journalled on anti-friction bearings 38 on the wheel spindle 17. The spindle is arranged so that it may be operated as a live spindle headstock or a dead center headstock. The sprocket 37 is connected by a stud 35 with a face plate or driving plate 39. In the position as illustrated rotary motion transmitted to the sprocket 37 will be imparted to rotate the work driving plate 39 while the work center remains stationary. The driving plate 39 is provided with a driving pin 40 which is arranged to engage either a portion of the workpiece to be ground or a work driving dog mounted thereon.

A suitable mechanism is provided for holding the headstock spindle 17 stationary when it is desired to operate the headstock for dead center grinding. This mechanism may comprise a gear 41 which is keyed on the spindle 17 (Fig. 7).

A slidably mounted locking pin 42 is arranged to be moved into engagement with the teeth of the gear 41 to lock the spindle 17 or may be withdrawn from engagement therewith if a live spindle grinding operation is to be performed. The locking pin 42 is slidably mounted within an aperture 43 formed within the headstock 15. The locking pin 42 is connected by a screw 44 with a block 45 having a cylindrical aperture 46 therein which engages an eccentric portion 47 of a rotatable shaft 48. The shaft 48 is journalled in bearings 49 and 50 which are mounted in the headstock 15. An actuating knob 51 is mounted on the righthand end of the shaft 48 to facilitate actuation of the locking pin 42.

If it is desired to operate the headstock 15 as a live spindle headstock, the stud 35 may be moved toward the left (Fig. 7) into engagement with a hole in a plate 36 which is keyed to the headstock spindle 17. The actuating knob 51 is then rotated to withdraw the locking pin 42 thereby unlocking the spindle 17. In this position of the parts, it will be readily apparent that rotary motion transmitted to the sprocket 37 will be imparted through the stud 35 to rotate the work driving plate 39 and also to rotate the plate 36 and the headstock spindle 17.

Figure 7:
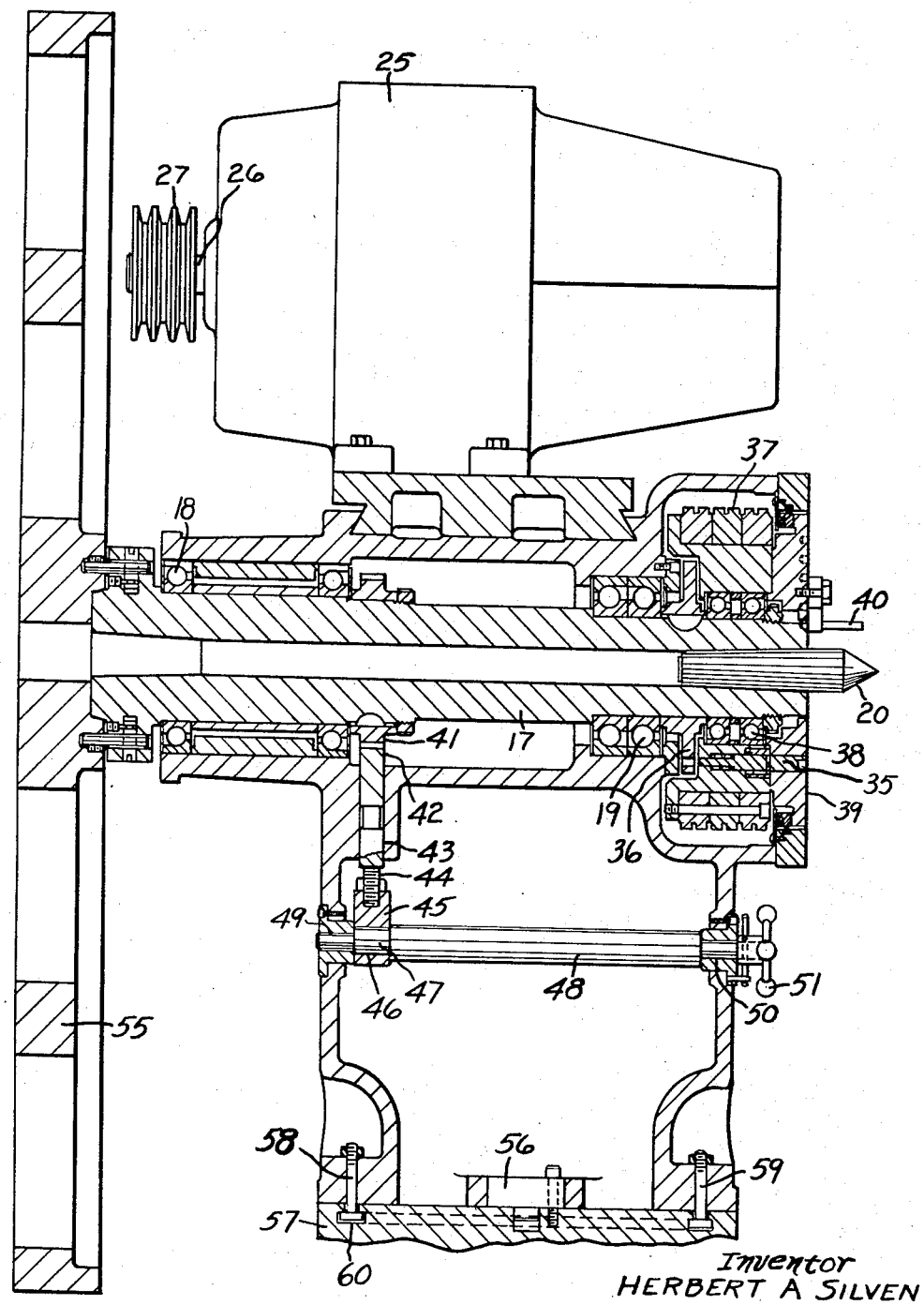
Fig. 7 is a vertical sectional view, on an enlarged scale, through the headstock.

The headstock 15 is also provided with a relatively large face plate 55 which is mounted on the left-hand end of the headstock spindle 17 (Fig. 7). It is desirable to provide a suitable swivel adjustment for the headstock 15 so that the parts may be shifted to facilitate either a center type grinding operation or a face plate type grinding operation. The headstock 15 is pivotally supported by a vertically arranged stud 56 carried by a base plate 57 which is clamped onto the upper surface of the swivel table 11. A pair of clamping bolts 58 and 59 are mounted on diametrically opposite sides of the pivot stud 56. The clamping bolts 58 and 59 pass through clearance holes in the headstock 15 and their heads are slidably supported in a circular T-slot 60 formed in the base plate 57. It will be readily apparent from the foregoing disclosure that by loosening the clamping bolts 58 and 59, the headstock 15 may be swivelled through 360° so as to present either the driving plate 39 and the work center 20 into an operative position, or to position the headstock 15 so that the face plate 55 is in the desired position for a grinding operation.

Figure 8:
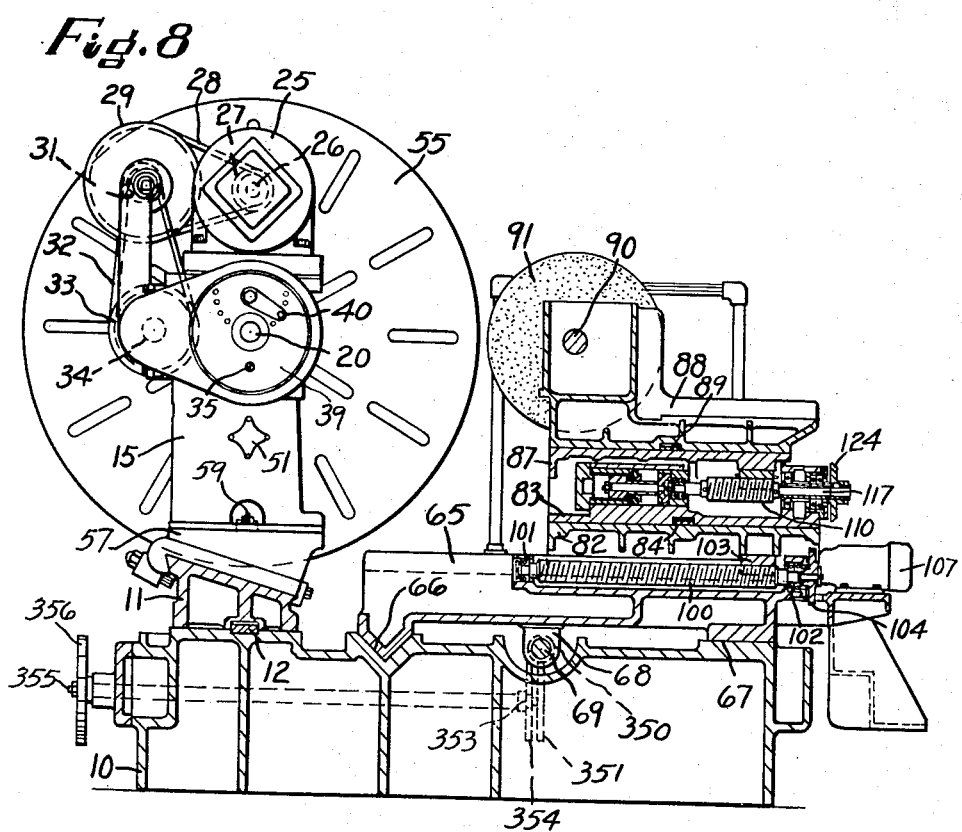
Fig. 8 is a vertical cross-sectional view, on an enlarged scale, taken approximately on the line 8—8 of Fig. 1, through the grinding machine.
Figure 9:
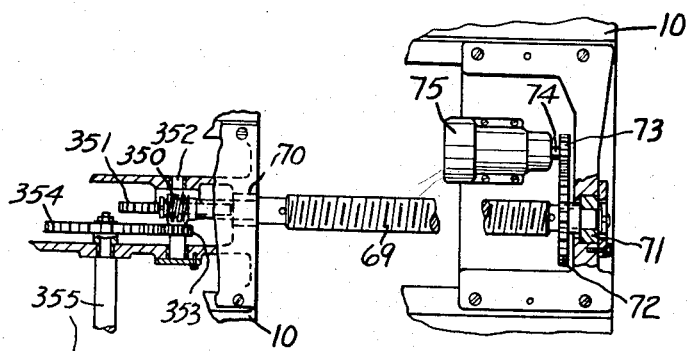
Fig. 9 is a fragmentary detail view, on an enlarged scale, of the grinding wheel carriage traversing and positioning mechanism.

The grinding machine as illustrated, is a travelling wheel type machine in which the grinding wheel to be hereinafter described is supported by a longitudinally traversable grinding wheel carriage 65 which is arranged to slide longitudinally on a V-way 66 and a flatway 67 (Fig. 8) formed on the upper surface of the base 10. The grinding wheel carriage 65 is provided with a suitable traversing mechanism comprising a nut 68 depending from the underside of the carriage 65. The nut 68 meshes with a rotatable screw 69. The screw 69 is journalled in spaced bearings 70 and 71 supported by the base 10. The rotatable screw 69 is provided with a gear 72 which meshes with a gear 73 mounted on a rotor shaft 74 of a fluid motor 75. Fluid under pressure is admitted to and exhausted from the fluid motor 75 through a pair of pipes 301 and 302 in a manner to be hereinafter described.

The grinding wheel carriage 65 is provided with a transversely arranged V-way 80 and a flatway 81 which serve as supports for a cross-slide 82. The upper portion of the cross slide 82 is circular in shape and supports a swivel plate 83.

The swivel plate 83 is arranged to swivel about a vertically arranged pivot stud 84. The swivel plate 83 is provided with a transversely arranged V-way 85 and a flatway 86 which are arranged to support a transversely movable wheel slide 87. The upper portion of the wheel slide 87 is circular in shape and is arranged to support a wheel head 88. The wheel head 88 is arranged to swivel about a vertically arranged pivot stud 89 carried by the wheel slide 87. The wheel head 88 serves as a support for a rotatable wheel spindle 90 which is journalled in suitable bearings 420 and 421 mounted within the wheel head 88. The wheel spindle 90 supports a pair of grinding wheels 91 and 92 at opposite ends thereof. The spindle 90 may be driven by any suitable mechanism such as for example a motor 93 mounted on the upper portion of the wheel head 88. The motor 93 is provided with a motor shaft 94 carrying a multiple V-groove pulley 95. The pulley 95 is connected by multiple V-belts 96 with a multiple V-groove pulley 97 mounted on the wheel spindle 90. It will be readily apparent that actuation of the motor 93 will be imparted to transmit a rotary motion to the grinding wheels 91 and 92.

A nut and screw feeding mechanism is provided between the carriage 65 and the lower cross slide 82 whereby a transverse movement of the wheel head together with the intermediate parts may be obtained. This mechanism comprises a rotatable screw 100 (Fig. 13) which is supported by a pair of spaced anti-friction bearings 101 and 102 mounted in the base 10. The screw 100 meshes with a nut 103 which is fixedly mounted on the underside of the cross slide 82. The feed screw 100 carries a gear 104 which meshes with a gear 105. The gear 105 is mounted on a rotor shaft 106 of a fluid motor 107. Fluid under pressure is conveyed to and from the fluid motor 107 through a pair of pipes 282 and 283 in a manner to be hereinafter described.

A nut and screw feeding mechanism is provided between the swivel plate 83 and the upper slide 87. A rotatable feed screw 110 is supported at one end in anti-friction bearings 111 and 112 which is keyed within a cylindrical aperture 113. The other end of the feed screw 110 is slidably keyed within a rotatable sleeve 114. The sleeve 114 is journalled in anti-friction bearings 115 and 116 which are supported by the swivel plate 83. A reduced cylindrical portion 117 of the feed screw 110 is slidably keyed within an aperture 118 in the sleeve 114 to facilitate an axial movement of the feed screw 110 for rapidly moving the wheel slide 87 and the wheel head 88 into an operative or inoperative position.

Figure 3:
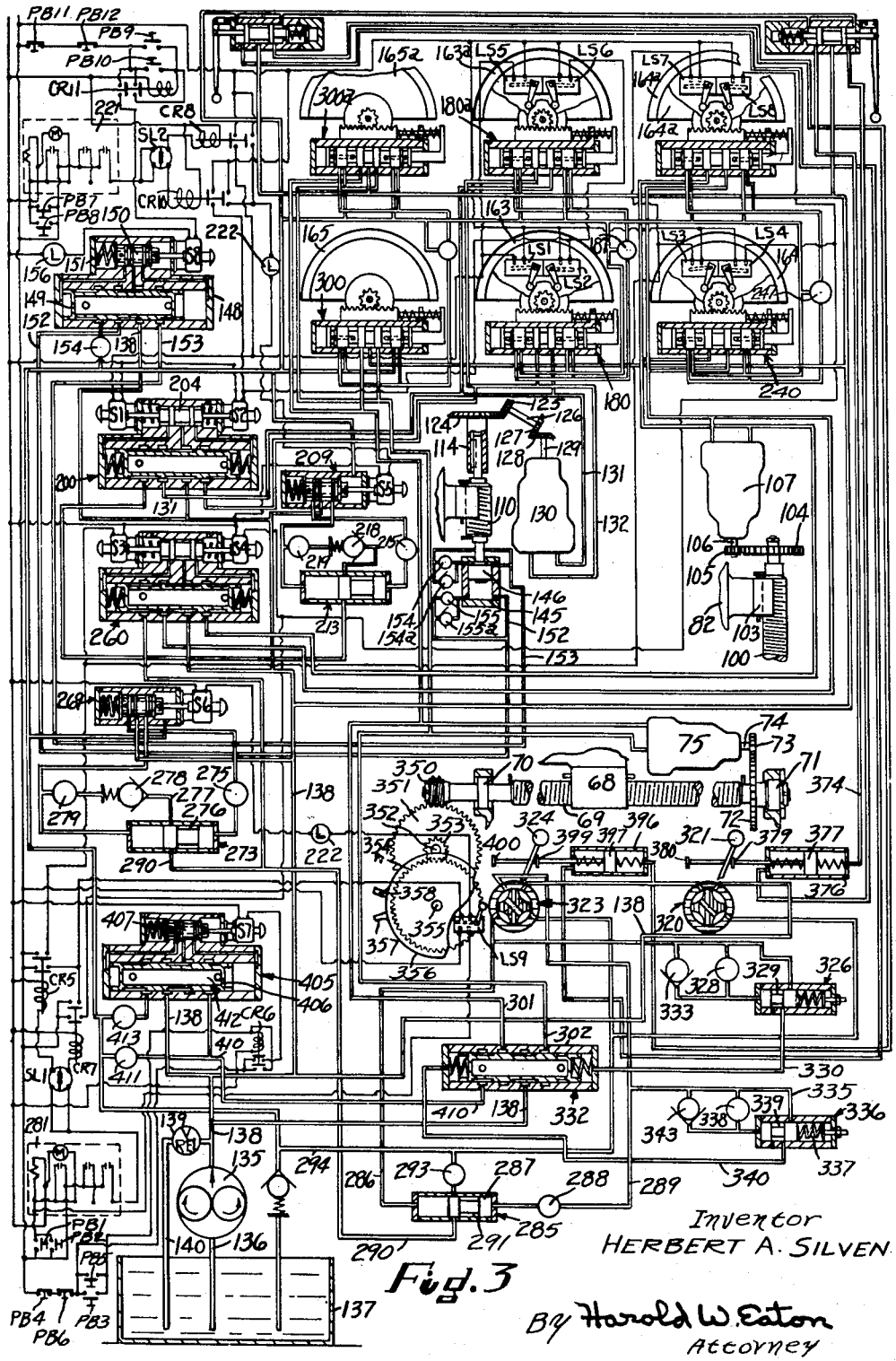
Fig. 3 is a combined electric and hydraulic diagram of the actuating mechanism of the machine and the controls therefor.

In order to impart a feeding movement to the upper slide 87, a bevel gear 124 is keyed on the right-hand end of the sleeve 114 (Figs. 3 and 13). The bevel gear 124 meshes with a bevel gear 125 carried by a shaft 126. The shaft 126 is connected by a pair of bevel gears 127 and 128 with a rotor shaft 129 of a fluid motor 130. Fluid under pressure is admitted to and exhausted from the motor 130 through a pair of pipes 131 and 132 in a manner to be hereinafter described. It will be readily apparent from the foregoing disclosure that a double swivel adjustment is provided, namely, the wheel head 88 may be swivelled relative to the upper slide 87 and the swivel plate 83 may be swivelled relative to the lower slide 82 to facilitate grinding angular and shouldered or side faces on a workpiece being ground. In any position of the swivel plate 83, the wheel head 88, the lower slide 82 may be fed transversely relative to the base and the upper slide 87 may be fed transversely relative to the swivel plate 83. By a combination of feeding movements, any angular surface may be ground on a workpiece either mounted on the work centers 20 and 21 or on the face plate 55.

A fluid pressure system is provided for supplying fluid under pressure to the various operating mechanisms of the machine. This system may comprise a motor driven fluid pump 135 (Fig. 3) which draws fluid through a pipe 136 from a fluid reservoir 137. The pump 136 forces fluid under pressure through a pipe 138 to the various operating mechanisms of the machine. A pressure relief valve 139 is connected with the pipe line 138 so that excess fluid under pressure may be bypassed through a pipe 140 into the reservoir 137.

It is desirable to provide a rapid approaching movement for the upper slide 87 to facilitate rapidly moving the grinding wheels to and from an operative position before and after a grinding operation. A hydraulically operated mechanism is provided comprising a cylinder 145 which is arranged in axial alignment with the feed screw 110. The cylinder 145 contains a slidably mounted piston 146 which is connected to one end of a piston rod 147. The other end of the piston rod 147 is fixedly connected to the slidably mounted sleeve 112 (Fig. 13) so that movement of the piston 146 will be imparted to cause an axial movement of the feed screw 110 rapidly to move the upper slide 87 to and from an operative position. A suitable control mechanism is provided for controlling the admission to and exhaust of fluid from the cylinder 145. This control mechanism may comprise a control valve 148 having a slidably mounted valve member 149 which is arranged to be shifted by means of fluid under pressure admitted to and exhausted from chambers formed in the opposite ends of the valve 148. A pilot valve 150 is provided for controlling the shifting movement of the valve member 149. The pilot valve 150 is normally held in a right-hand end position by means of a compression spring 151. A solenoid S8 is provided for shifting the pilot valve into a left-hand end position so as to admit fluid under pressure into the left-hand end chamber to shift the valve member 149 toward the right so as to change the direction of fluid under pressure passing through a pair of pipes 152 and 153 which connect the valve 148 with the cylinder 145. A switch PB9 or a switch PB10 may be actuated to energize a relay switch CR11 to energize the solenoid S8 to initiate a rapid forward movement of the upper slide 87. A switch PB11 or a switch PB12 may be actuated to break the circuit thereby deenergizing the solenoid S8 to return the upper slide 87 to a rearward position.

It is desirable to provide suitable means for slowing down the rapid approaching movement before the piston 146 reaches the end of its stroke in either direction. This is preferably accomplished by providing a pair of throttle valves 154 and 155 which are arranged to control the admission of fluid into the cylinder 145 after the main port has been closed. A pair of ball check valves 154a and 155a are provided to allow fluid under pressure to pass in one direction unrestricted by bypassing around the throttle valves 154 and 155 respectively.

Figure 2:
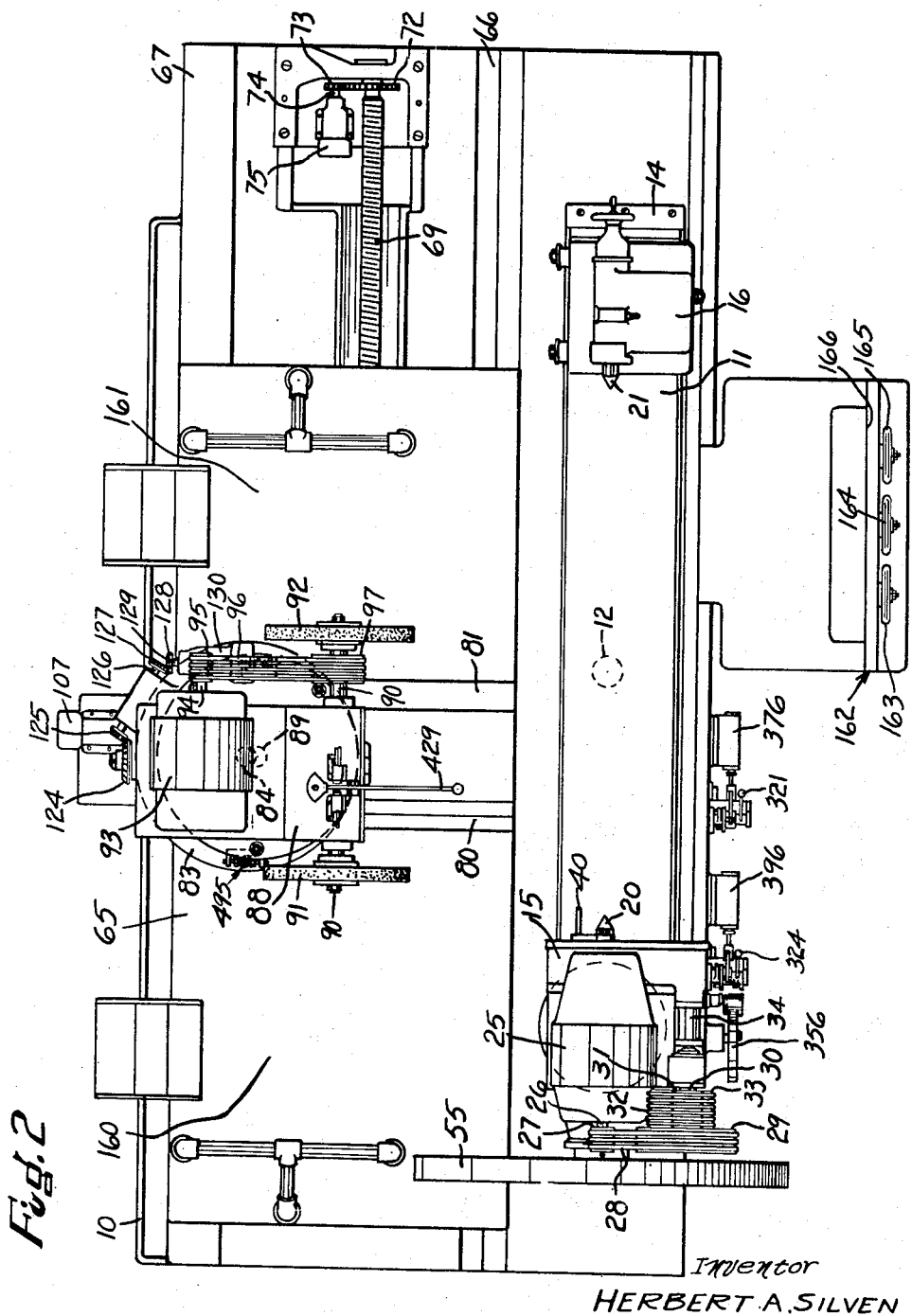
Fig. 2 is a fragmentary plan view of the grinding machine with the upper control panels and mounting therefor removed.

In a large universal type machine, such as disclosed, it is desirable to provide adequate controls for the various mechanisms of the machine so that the operation thereof may be readily controlled from the front of the machine base or from an operator's control station 160 or 161 on the longitudinally reciprocable carriage 65 (Fig. 2). A control unit 162 is mounted on the front of the machine base (Figs. 1 and 16). This control unit is provided with a plurality of hand wheels consisting of a hand wheel 163 for controlling the movement of the upper slide 87, a hand wheel 164 for controlling the lower slide 82 and a hand wheel 165 for controlling the carriage 65. An electrical control panel 166 is mounted above the control unit 162 (Figs. 1 and 16) whereby the various units may be controlled from the front of the machine base.

A similar control unit 162a is mounted on a bridge-type frame 168 (Figs. 1 and 19) which is supported on the longitudinally movable carriage 65. The control unit 162a also is provided with a plurality of hand wheels, a hand wheel 163a for controlling the upper slide 87, a hand wheel 164a for controlling the lower slide 82 and a hand wheel 165a for controlling the movement of the carriage 65. An electrical control panel 166a is mounted on the upper portion of the control unit 162a to facilitate controlling the electrical units of the machine. An electric light bulb 156 on the upper control unit 162a is connected in series between the solenoid S8 and one side of the power lines which is illuminated when the solenoid S8 is energized visibly to indicate that the upper slide is in a forward position.

In order that the upper control unit 162a may be readily accessible and within easy reach of either the control station 160 or 161, the control unit is preferably pivotally mounted on a pivot stud 167 (Fig. 20) supported on the bridge-type frame 168. The bridge-type frame 168 is provided with an arcuate shaped plate 169 which serves as a slideway for the control unit 162a. A clamping screw 170 (Figs. 1 and 19) passes through an elongated arcuate slot 171 (Fig. 20) formed in the plate 169 and is screw threaded into a nut 172 carried by the unit 162a. It will be readily apparent from the foregoing disclosure that by loosening the clamping screw 170, the control unit 162a together with the electrical control panel 166a may be readily swivelled on the pivot stud 167 so as to bring the hand wheels 163a, 164a and 165a together with the push buttons on the electrical control panel 166a within easy reach of the control station 160 and 161.

The hand wheels 163, 163a, 164, 164a, 165 and 165a are each operatively connected to actuate independent control valves in a manner to be hereinafter described. The mechanical connections between these hand wheels and the respective control valves are identical in construction, consequently only one of these mechanisms has been illustrated in detail. As shown in Figs. 16, 17 and 18, the hand wheel 163 is keyed on a sleeve 174 which is in turn rotatably supported on a fixed shaft 175. A gear 176 is keyed on the sleeve 174 and meshes with a rack bar 177. The rack bar is connected by means of a rod 178 with a valve stem 179 of a control valve 180. A compression spring 181 is provided normally to hold the valve stem 179 and the associated parts in a central position. A cam 182 is keyed on the sleeve 174 and is arranged to actuate either an actuating arm 183 or an actuating arm 184 of a limit switch LS1 or a limit switch LS2 respectively, depending upon the direction of rotation of the hand wheel 163 and the sleeve 174.

In order to provide precise and positive control of the fluid motors 107 and 130 for controlling transverse movements of the lower slide 82 and the upper slide 87, respectively, fluid under pressure is normally supplied to both pipes leading to each of the fluid motors. When it is desired to impart a feeding motion either to the lower slide 82 or the upper slide 87, the fluid pressure to one side or the other of the motor is opened to the exhaust thereby allowing the motor to transmit the desired feeding movement to either the feed screw 100 or the feed screw 110. As illustrated in the drawings, an inching feed may be obtained by a slight rotation of the hand wheel 163 in a counterclockwise direction which serves to shift the valve stem 179 so as to open an exhaust port 185 in the valve 180 so that fluid may exhaust through a pipe 186, through a throttle valve 187 and through an exhaust pipe 188 into the reservoir 137. By controlling the throttle valve 187, the rate of rotation of the feed screw 110 may be readily varied as desired. A similar port 189 is provided so that when the hand wheel 163 is rotated in a clockwise direction, the valve stem 179 will be shifted so as to open the port 189 which allows fluid to exhaust from the other side of the motor through the same throttle valve 187 into the exhaust pipe 188 to control the rotation of the feed screw 110 in the opposite direction.

A suitable mechanism is provided normally to limit the rotation of the hand wheel 163 in either direction so that only sufficient movement is imparted to the valve stem 179 to open either the port 185 or the port 189 depending upon the direction of rotation of the hand wheel 163. This mechanism may comprise a slidably mounted stop pin 190 (Fig. 17) which is supported by the hand wheel 163. The right-hand end of the pin 190 rides with an elongated arcuate slot 191 having a pair of stop surfaces 193 and 194 formed in a plate 192 which is fixedly mounted relative to the valve 180.

For a rapid transverse movement of the upper slide 87, it is desired to bypass fluid around the throttle valve 187 so that a rapid movement of the upper slide 87 may be obtained when desired. A rock arm 195 is pivotally supported on the hand wheel 163. When it is dsired to obtain a rapid movement of the upper slide 87, the rock arm 195 may be rocked in a clockwise direction (Fig. 17) to withdraw the pin 190 from the slot 191 so that an increased rotary motion of the hand wheel 163 is permitted. The increased rotary motion of the hand wheel 163 serves to cause an increased motion of the valve stem 179 in either direction depending upon the direction of rotation of the hand wheel 163 so as to open either an exhaust port 195 or an exhaust port 197 which exhaust fluid from the motor 130 directly through the pipe 188 into the reservoir 137.

The hand wheel 163a is supported on a shaft 175a carried by the upper control unit 162a. A cam 182a is keyed to rotate with the hand wheel 163a and is arranged to actuate the actuating arms 183a and 184a of a pair of limit switches LS5 and LS6 respectively when the hand wheel is rotated in either direction. A gear 176a is keyed to rotate with the hand wheel 163a and meshes with a rack bar 177a. The rack bar 177a is connected by a rod 178a with a valve stem 179a of a control valve 180a. A compression spring 181a serves normally to hold the valve stem 179a in a central position. The valve 180a is identical in construction with the valve 180 and is provided with ports 185a, 189a, 196a and 197a which are connected with the pipes 186a and 188 respectively. In the normal operation of the hand wheel 163a that is for an inching feed, the hand wheel 163a is rotated either in a clockwise direction or counter-clockwise direction to open either the port 189a or the port 185a so that fluid may exhaust through the pipe 186a, through the common throttle valve 187 and out through the exhaust pipe 188. If it is desired to cause a rapid movement of the upper wheel slide, the rock arm 195a is rocked to withdraw the slide pin (not shown) to allow a further rotary motion of the hand wheel 163a so as to open either the ports 196a or 197a so that fluid exhausting from the system may bypass the throttle valve 187 and pass directly into the exhaust pipe 188. The hand wheels 163 and 163a as above described are connected in parallel so that actuation of either hand wheel operates to control the stopping and starting of the upper slide motor 130. The mechanisms above described controlled by the hand wheels 163 and 163a serve to provide a continuous slow or fast infeed of the upper slide in either direction.

Figure 5:
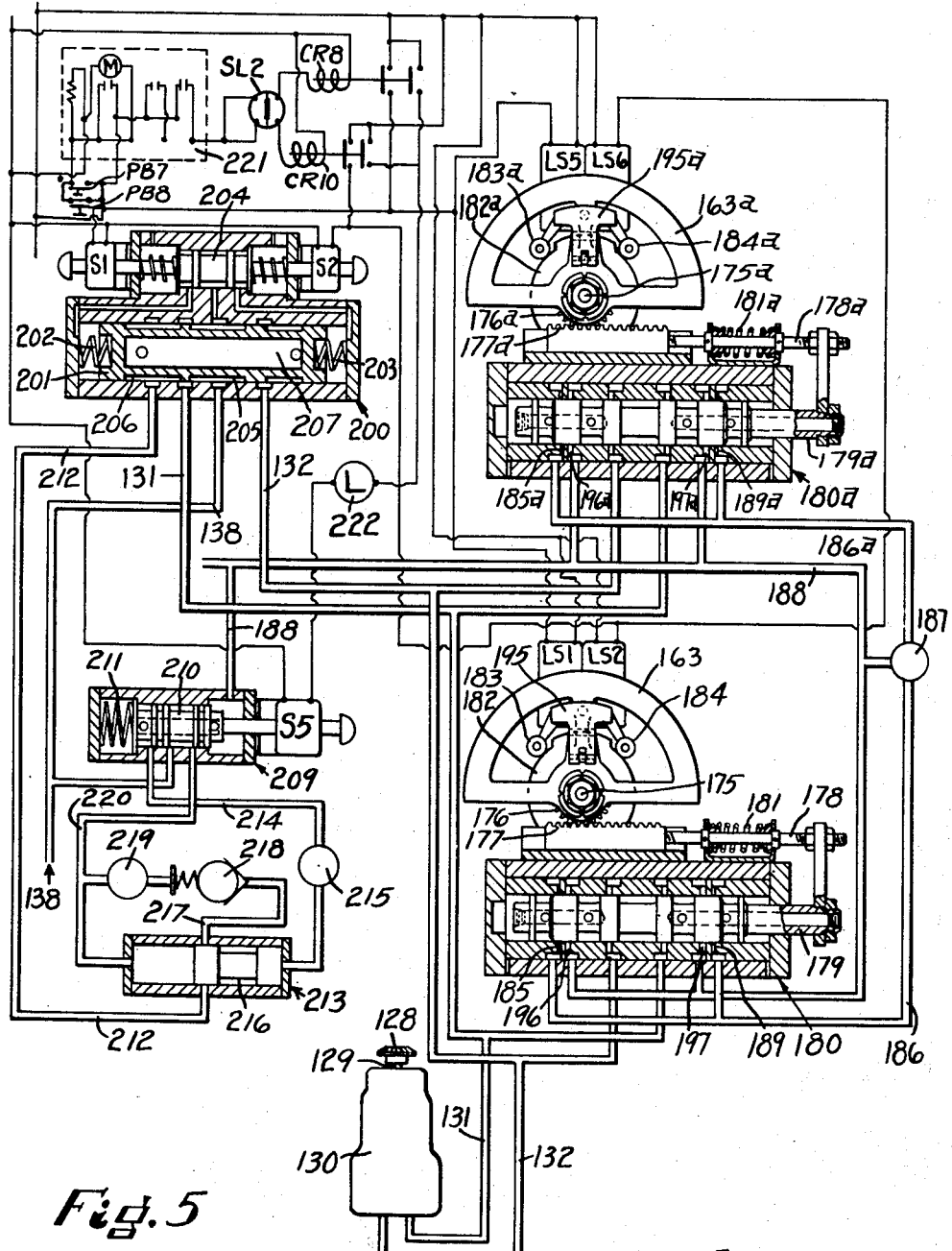
Fig. 5 is a combined electrical and hydraulic diagram, on an enlarged scale, of the controls and actuating mechanism for the upper slide.

It is desirable to provide a pick feed mechanism whereby the upper slide may be advanced in a forward or rearward direction by a predetermined increment each time the mechanism is actuated. This mechanism is preferably arranged so that a pick or incremental feed may be obtained either in a forward direction for an external grinding operation or in a rearward direction for an internal grinding operation as desired. This mechanism may consist of a fluid actuated control valve 200 having a slidably mounted valve member 201 which is normally held in a central position by a pair of compression springs 202 and 203 located in the opposite end chambers of the valve 200. A pilot valve 204 is provided for controlling the shifting movement of the valve 200. The pilot valve 204 is normally held in a central position as illustrated in Fig. 5 by opposed compression springs. A solenoid S1 and a solenoid S2 are provided to shift the pilot valve 204 in opposite directions to control the direction of flow of fluid to the fluid motor 130. When the solenoid S1 is energized, the valve 204 is shifted toward the right to pass fluid into the right-hand end chamber of the valve 200 to shift the valve member 201 toward the left so that fluid under pressure from the pressure pipe 138 may pass through a valve chamber 205 and out through the pipe 131 so that when fluid is exhausted from the other side of the motor a transverse feeding movement may be obtained in a forward direction. Similarly when the solenoid S2 is energized the valve member 201 is shifted toward the right so that fluid under pressure in the pressure line 138 may pass through the valve chamber 205 and through the pipe 132 to the motor 130.

A suitable electric control is provided for actuating the pilot valve 204. This mechanism may comprise a pair of pushbutton switches PB7 on the upper control unit 162a and PB8 on the lower control unit 162. The pushbutton switches PB7 and PB8 are connected in parallel to start an electric timer 221 to close a circuit. A selector switch SL2 is provided so that either a magnetic switch CR8 or a magnetic switch CR10 may be actuated to energize the solenoids S1 and S2 respectively so as to cause either a feeding movement in a forward or rearward direction depending upon the set-up of the machine. If the selector switch is rotated in a clockwise direction, the magnetic switch CR8 is connected so that when either the pushbutton switch PB7 or PB8 are actuated the timer 221 will be started to energize the switch CR8 thereby energizing the solenoid S1 to shift the valve member 201 to cause a forward feeding increment of the upper slide motor 130.

Similarly if the selector switch is rotated in a counter-clockwise direction the magnetic switch CR10 is connected so that when the timer 221 is set in motion the magnetic switch CR10 is closed to energize the solenoid S2 so as to shift the valve member 201 in a direction toward the right to pass fluid under pressure so as to cause a rearward feeding increment of the motor 130. The electric timer 221 is adjustable so that the duration of the pick or increment may be adjusted as desired. After the timer has run for the set period, magnetic switch CR8 or the magnetic switch CR10 is deenergized thereby deenergizing either the solenoid S1 or the solenoid S2 to allow the valve member 201 to return to a central or neutral position.

In order to give a precise control of the pick or incremental feed, a suitable mechanism is provided for controlling the exhaust of fluid from the motor 130. This mechanism preferably comprises a solenoid valve 209 having a slidably mounted valve member 210 which is normally held in a right-hand end position by means of a compression spring 211. A solenoid S5 is provided which when energized serves to shift the valve member 210 toward the left. A pipe 212 connects the control valve 200 with a metering valve 213. The metering valve 213 is a fluid actuated valve. In the position of the valves 209 and 213 (Fig. 5) fluid under pressure from the pipe 138 passes through a valve chamber in the valve 209, through a pipe 220 into a left-hand end chamber of the valve 213 to maintain the valve 213 in its extreme right-hand end position. When either the magnetic switch CR8 or CR10 is energized, contactors therein serve to close a circuit to energize the solenoid S5 so that fluid from the pressure pipe 138 may pass through the valve 209, through a pipe 214, through a throttle valve 215 into the right-hand end chamber of the valve 213 to move the valve 213 toward the left. During this longitudinal shifting movement of the valve 213, fluid may exhaust from the motor 130 through the valve 200, through the pipe 212, through a valve chamber 216 in the valve 213 through a pipe 217, a ball check valve 218 and a throttle valve 219 and pass through the pipe 220, through the valve 209 into the common exhaust line 188. The speed of movement of the valve 213 is regulated by the setting of the throttle valve 215 so that a predetermined amount of fluid may be metered therethrough. The rate of exhaust of fluid from the motor 130 is controlled by the setting of the throttle valve 219. A signal light 222 is provided so that the operator may know when the pick or incremental feed is in operation. A second pick feed cannot be obtained until the first pick feed has been completed and the timer reset to its initial position. An electric light bulb 222 on the upper control unit 162a is connected in series between the magnetic switches CR8—CR10 and the solenoid S5 and also connected in series between switches CR5—CR7 and the solenoid S6 visibly to indicate that the pick feed of the upper slide 87 or the lower slide 82 is operative under control of the timer 221 or the timer 281 respectively.

A similar set of controls is provided for controlling the slow and rapid feeding movement of the lower slide 82 which is actuated by the hand wheels 164 and 164a. A pair of pushbutton switches PB1 and PB2 are provided for controlling a pick feed of the lower slide 82 as will be hereinafter described.

The hand wheel 164 mounted on a shaft 235 on the lower control unit 162 is connected to rotate a cam 242 which is arranged to actuate the control arms 243 and 244 of a pair of limit switches LS3 and LS4 respectively when the hand wheel is rotated either in a counter-clockwise or a clockwise direction. The hand wheel 164 is also connected to rotate a gear 236 which meshes with a slidably mounted rack bar 237. The rack bar 237 is connected by a rod 238 to a valve stem 239 of the control valve 240. A compression spring 241 serves normally to hold the valve stem 239 in a central position. The control valve 240 is provided with a pair of ports 248 and 249 for controlling the slow feed of the lower slide 82. The valve 240 is also provided with a second pair of ports 256 and 257 for controlling the rapid feeding movement of the lower slide 82. A slidably mounted stop pin, identical with that illustrated in connection with the hand wheel 163, is provided normally to limit the rotary motion of the hand wheel 164 so that either the port 248 or the port 249 is opened to allow fluid to exhaust through a pipe 246, through a throttle valve 247 and out through the common exhaust pipe 188. The setting of the throttle valve 247 determines the rate of slow feeding movement of the lower slide 82. When it is desired to cause a rapid feeding movement of the lower slide 82 a rock arm 255 on the hand wheel 164 is actuated to withdraw the stop pin 250 so as to allow a greater rotary motion to be imparted to the hand wheel so that either the port 256 or the port 257 may be opened to exhaust fluid directly into the common exhaust pipes 188 so that a rapid feeding movement of the lower slide may be obtained in either direction.

Similarly the hand wheel 164a is mounted on a shaft 235a carried by the upper control unit 162a. The hand wheel 164a is connected to rotate a gear 236a meshing with a slidably mounted rack bar 237a. The rack bar 237a is connected by a rod 238a to a valve stem 239a of a control valve 240a. The control valve 240a is provided with ports 248a and 249a for controlling the slow feeding movement of the lower slide 82 in either direction. The control valve 240a is also provided with a pair of ports 256a and 257a for controlling the rapid movement of the lower slide 82 in either direction depending upon the direction of rotation of the hand wheel 164a. The hand wheel 164a is provided with a normally operative slidably mounted stop pin 250a which limits the rotary motion of the hand wheel 164a in either direction so that either the port 248a or the port 249a may be opened to allow fluid to exhaust through a pipe 246a and through the throttle valve 247a into the common exhaust pipe 188. The hand wheel 164a is also provided with a rock arm 255a to facilitate withdrawing the stop pin 250a to an inoperative position so as to facilitate a greater rotary motion of the hand wheel 164a to open either the port 256a or the port 257a which allows fluid to exhaust directly into the common exhaust pipe 188 to facilitate a rapid feeding movement of the lower slide 82 in either direction depending upon the direction of rotation of the hand wheel 164a. It will be readily apparent from the foregoing disclosure that the control valves 240 and 240a are connected in parallel so that the slow or rapid feeding movement of the lower slide 82 in either direction may be readily controlled from either the lower control unit 162 on the front of the machine base, or may be controlled from the upper control unit 162a as desired.

The hand wheel 164a is also connected to rotate a cam 242a which is arranged to actuate either the actuating arm 243a or the actuating arm 244a of a pair of limit switches LS7 and LS8 respectively when the hand wheel 164a is rotated in either a counter-clockwise or a clockwise direction. The control valves 240 and 240a are connected to control the exhaust of fluid from the motor 107.

Figure 6:
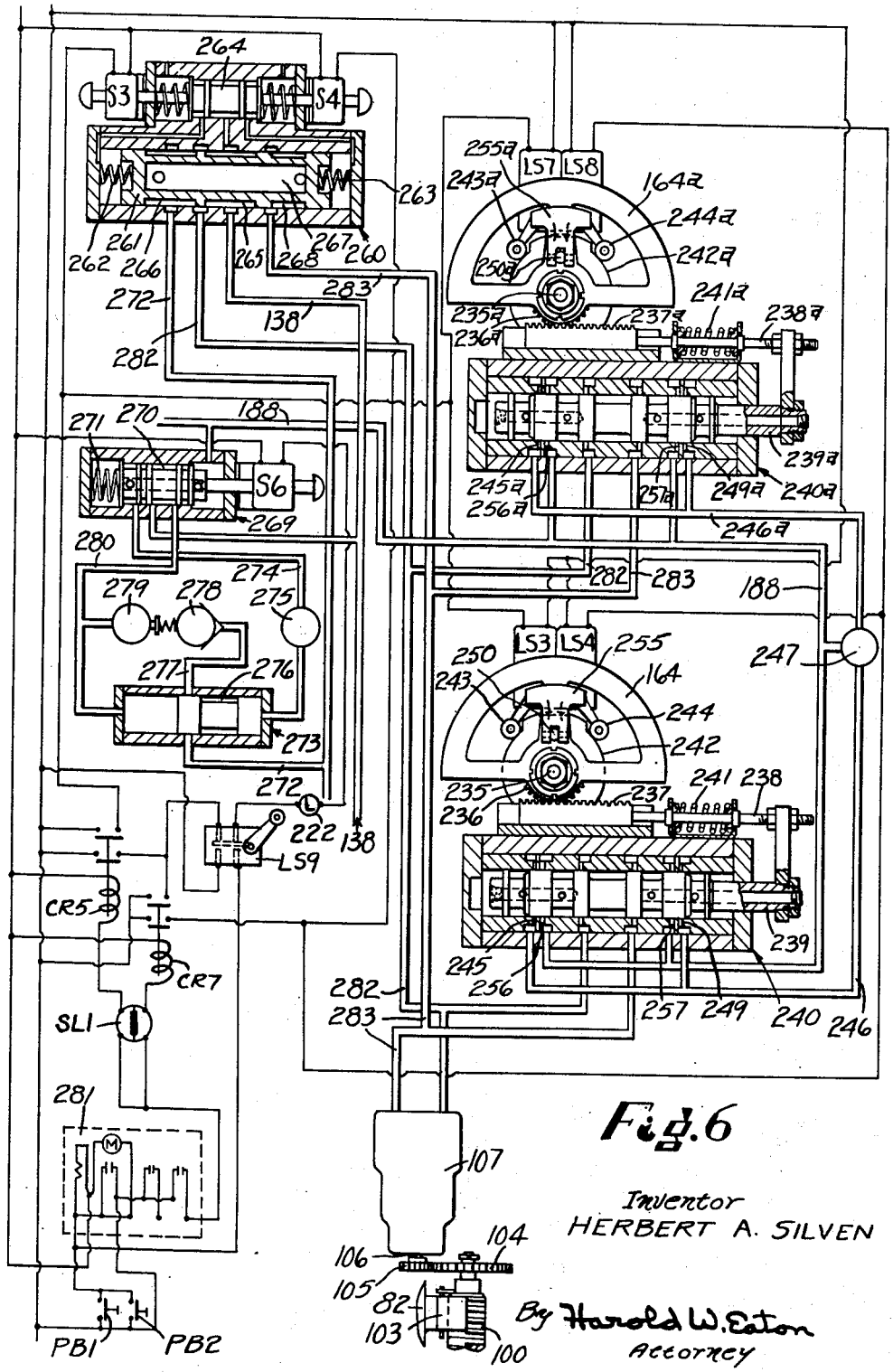
Fig. 6 is a combined electrical and hydraulic diagram on an enlarged scale, of the controls and actuating mechanism for the lower slide.

In order to control the direction of rotation of the motor 107 to determine the direction of feed of the lower slide 82, a control valve 260 is provided having a slidably mounted valve member 261 which is normally held in a central position by means of opposed compression springs 262 and 263 (Fig. 6). A pilot valve 264 is provided for controlling the admission of fluid to opposite end chambers in the valve 260. The pilot valve 264 is actuated by a pair of solenoids S3 and S4. When a forward feeding movement of the lower slide is desired, either the hand wheel 164 or the hand wheel 164a is rotated in a counter-clockwise direction to actuate either the limit switch LS3 or the limit switch LS7 to energize the solenoid S3 thereby shifting the pilot valve 264 toward the right so that fluid under pressure enters the right-hand end chamber of the valve 260 to move the slidably mounted valve member 261 toward the left. In this position of the valve fluid under pressure in the pipe line 138 passes through a valve chamber 265 and through a pipe 282 to the motor 107 and also to the control valves 240 and 240a. Similarly if a rearward feeding movement of the lower slide 82 is desired, the hand wheel 164 or 164a are rotated in a clockwise direction to actuate either the limit switch LS4 or the limit switch LS8 to energize the solenoid S4 thereby shifting the pilot valve 264 toward the left to move the slidably mounted valve member 261 toward the right so that fluid under pressure from the pressure pipe 138 may pass through the valve chamber 265 and through the pipe 283 to the motor 107 and also to the control valves 240 and 240a respectively so as to cause either a forward or rearward feeding movement of the lower slide 82.

If a pick feed in a forward direction is desired, a selector switch SL1 (Fig. 6) is rotated in a counter-clockwise direction so that when either the pushbutton switch PB1 or PB2 is actuated, an electric timer 281 is set in motion to close a circuit thereby energizing a magnetic switch CR5 to energize the solenoid S3. The solenoid S3 remains energized for a predetermined time as governed by the setting of the timer 281. Similarly if a rearward pick feed of the slide 82 is desired, the selector switch SL1 is rotated in a clockwise direction so that when either of the pushbutton switches PB1 or PB2 is closed to set the timer 281 in motion, a magnetic switch CR7 is energized to close a circuit so as to energize the solenoid S4 which serves to cause a predetermined pick feed the extent of which is governed by the setting of the timer 281.

In order to control the amount of pick feed, a suitable metering device is provided to allow a predetermined amount of fluid to exhaust from the fluid motor 107. This is preferably accomplished by means of a solenoid actuated valve 269 having a slidably mounted valve member which is normally held in a right-hand end position (Fig. 6) by means of a compression spring 271. A solenoid S6 is provided to shift the valve 269 into a left-hand end position when a pick feed movement of the lower slide is desired. A fluid pressure actuated metering valve 273 is provided to control the amount of fluid exhausting from the motor 107 and thereby to control the amount of infeed for each pick. As shown in Fig. 6, fluid under pressure from the pressure pipe 138 enters a valve chamber 270 of the valve 269 and passes through a pipe 280 into the right-hand end chamber of the valve 273 to hold the valve in a right-hand end position. When either the magnetic switch CR5 or CR7 is energized for either a forward or rearward pick feed, a circuit is closed through one set of normally closed contactors of a limit switch LS9 to energize the solenoid S6 to shift the valve 269 into a left-hand end position so that fluid under pressure entering the valve chamber 270 may pass through a pipe 274, through a throttle valve 275 into the right-hand end chamber of the metering valve 273 to move the valve toward the left. The rate of movement of the valve 273 in either direction is governed by the setting of the throttle valve 275. During the movement of the valve 273 toward the left fluid may exhaust from the valve 260 through a pipe 272 and through the valve chamber 276 in the metering valve 273, through a pipe 277, through a ball check valve 278, through a throttle valve 279 and exhaust through the pipe 280 into the common exhaust pipe 188. The setting of the throttle valve 279 determines the rate of fluid exhausting through the metering valve 273 and the setting of the throttle valve 275 determines the rate of movement of the metering valve 273 so that a precise pick feed may be obtained either in a forward or rearward direction by actuating either of the pushbuttons PB1 or PB2, the direction of movement of the pick feed being determined by the setting of the selector switch SL1. The electric light bulb 222 is illuminated as previously described visibly to indicate that a pick feed of the lower slide 82 is in progress.

It will be readily apparent from the foregoing disclosure that the control valve 260 determines the direction of feed, that is, whether a forward or rearward feeding movement. Actuation of the hand wheel 164 or the hand wheel 164a controls the actuation of the valve 260 and also determines whether a fast or a slow continuous feeding movement of the lower slide. The metering valve 273 together with the solenoid actuated control valve 69 and the controls therefor also actuate the control valve 260 and control a pick feed movement of the lower slide either in a forward or rearward direction.

It is desirable to provide mechanism whereby an automatic infeed of the lower slide may be obtained during reversal of the carriage 65 in a traverse grinding operation. This is preferably accomplished by means of a fluid actuated metering valve 285. A pipe 286 connects one side of the reversing valve 320 with the left-hand end of the metering valve 285. The metering valve 285 contains a slidably mounted valve member 287. The right-hand end of the metering valve 285 is connected by a pipe 289 and a throttle valve 288 with the other side of the reversing valve 323. The throttle valve 288 serves to determine the rate of movement of the valve member 287. When the reversing valve 323 is shifted into a reverse position fluid under pressure may pass through the pipe 289, through the throttle valve 288 into a chamber formed at the right-hand end of the metering valve 285. During the movement of the valve member 287 in either direction fluid exhausting from the control valve 260 through a pipe 290 may pass through a valve chamber 291 during the longitudinal movement of the valve member 287 and exhaust through a pipe 292, through a throttle valve 293 and through a pipe 294 into the reservoir 137. The throttle valve 288 determines the speed of movement of the valve 287 and the throttle valve 293 determines the rate of exhaust of fluid from the pipe 290. It will be readily apparent from the foregoing disclosure that when the machine is set up for a traverse grinding operation, at each actuation of the limit switch LS9, during reversal of the carriage 65, the electric timer 281 is energized to actuate the control valve 260 either toward the right or toward the left depending upon the setting of the selector switch SL1 to allow fluid to exhaust through the pipe 290. During reversal, the reversing valve 323 is shifted to change the direction of rotation of the fluid motor 75. During this reversal of the motor 75, fluid is passed either through the pipe 286 or the pipe 289 to actuate the metering valve 285 so as to meter a predetermined volume of fluid from the fluid motor 107, through the valve 260 to impart an infeeding movement to the lower slide 82.

Figure 4:
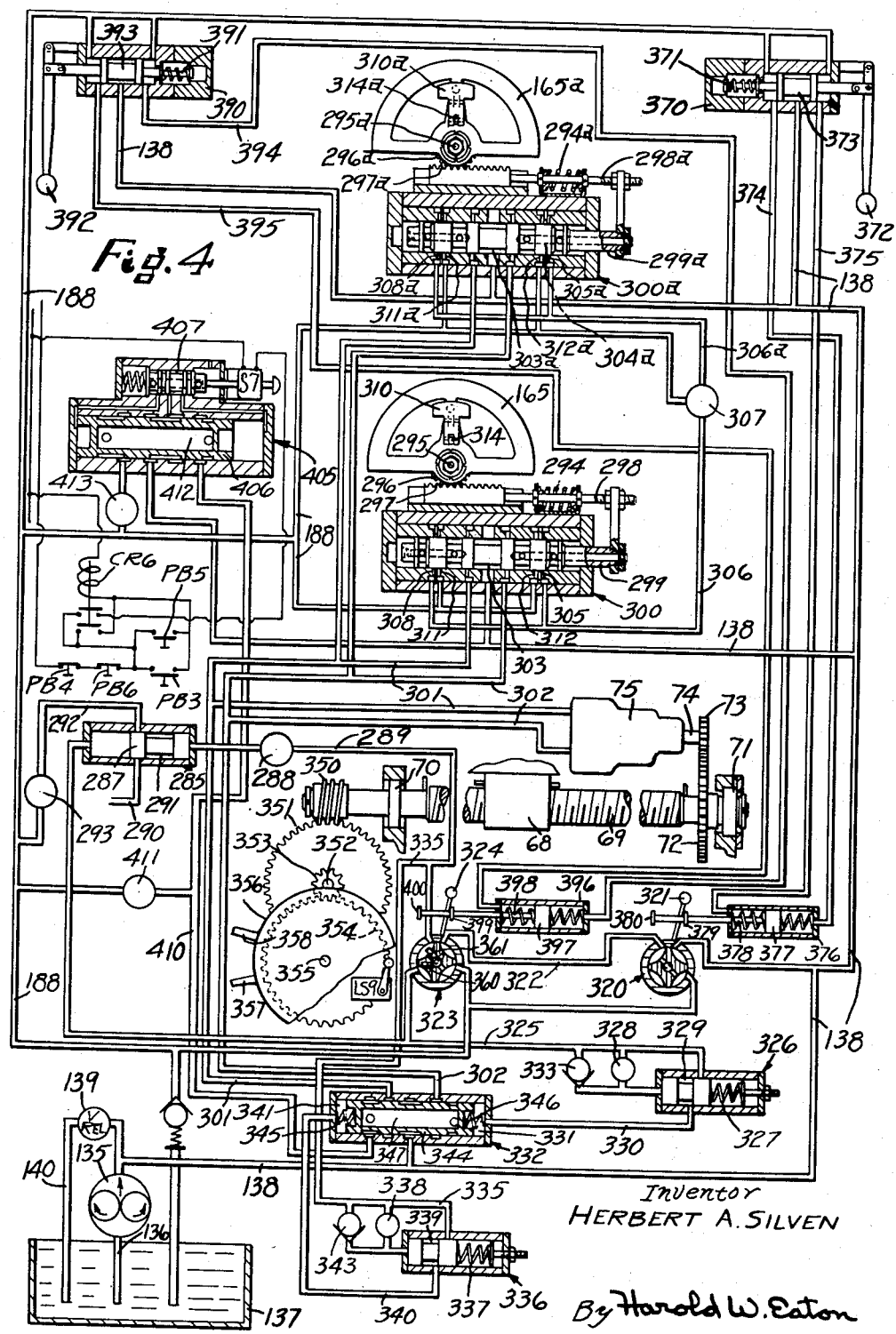
Fig. 4 is an hydraulic diagram, on an enlarged scale, of the controls and actuating mechanism for the longitudinally movable carriage.

A suitable control mechanism is provided for controlling the longitudinal movement of the carriage 65. The manually operable hand wheel 165 is mounted on a shaft 295 carried by the lower control unit 162. The hand wheel 165 is connected to rotate a gear 296 which meshes with a rack bar 297. The rack bar 297 is connected by a rod 298 with a valve stem 299 of the control valve 300. A compression spring 294 serves normally to maintain the valve stem 299 in a central or neutral position. The construction of the hand wheel and its supporting parts is identical with that shown in connection with the hand wheel 163 (Figs. 17 and 18). A slidably mounted stop pin 314 carried by the hand wheel 165 serves to limit the rotary motion of the hand wheel 165 in either direction so that the valve stem 299 may be moved only a sufficient distance to open a port 305 or 308 to obtain a slow rotation of the traverse motor 75. As shown in Fig. 4 fluid under pressure from the pressure pipe 138 enters a valve chamber 303. Rotation of the hand wheel 165 in a clockwise direction serves to move the valve stem 299 toward the right to open the port 305 to exhaust fluid into a pipe 306. Fluid under pressure within the valve chamber 303 passes through a pipe 301 to the fluid motor 75 to start rotation thereof in one direction. Fluid from the other side of the motor exhausts through a pipe 302, through a central passage 304 within the valve stem 299, through the pipe 306, through a throttle valve 307 into the common exhaust line 188. The speed of movement of the motor 75 is determined by the setting of the throttle valve 307. Similarly if the hand wheel is rotated in a clockwise direction the valve stem 299 is moved toward the right so that fluid under pressure within the valve chamber 303 passes through the pipe 302 to the opposite side of the motor 75 to rotate the motor in the opposite direction thereby reversing the direction of rotation of the traversing screw 69.

If a rapid manually controlled traversing movement of the carriage 65 is desired, a rock arm 310 on the hand wheel 165 is actuated to withdraw the stop pin 314 to an inoperative position so that the hand wheel 165 may be rotated through a greater distance in either a clockwise or counter-clockwise direction to open either the port 311 or the port 312 so that pressure exhausting from the motor 75 may pass directly into the common exhaust pipe 188 to obtain a rapid traversing movement of the carriage 65.

Similarly the hand wheel 165a is rotatably supported on a shaft 295a carried by the upper control unit 162a. The hand wheel 165a is connected to rotate a gear 296a which meshes with a rack bar 297a. The rack bar 297a is connected by a rod 298a with a valve stem 299a of the valve 300a. The valve 300a is provided with slow speed ports 305a and 306a which allow fluid to exhaust through a pipe 306a and through the throttle valve 307 into the common exhaust pipe 188. It will be readily apparent from the foregoing that the throttle valve 307 controls the rate of slow traversing movement of the carriage 65 whether actuated by the hand wheel 165 or 165a. The valve 300a is also provided with rapid speed exhaust ports 311a and 312a whereby fluid may be exhausted directly into the common exhaust pipe 188. If it is desired to obtain a rapid traverse from the upper control unit 162a, a rock arm 310a carried by the hand wheel 165a is actuated to withdraw a stop pin 314a to allow a greater rotary motion of the hand wheel 165a. The mechanism above described facilitates manual traversing of the carriage 65 either at a very slow rate or at a rapid rate to position the carriage manually.

It is desirable to provide mechanism for automatically reciprocating the carriage 65 for a traverse grinding operation. This mechanism may include a manually operable start-stop valve 320. The valve 320 is preferably a rotary-type valve which is actuated by a manually operable control lever 321 located on the front of the machine base 10. The valve 320 serves to control the passage of fluid from the pressure pipe 138 into a pipe 322 which conveys fluid under pressure to a rotary-type reversing valve 323. The valve 323 is actuated by a manually operable control lever 324 located on the front of the machine base 10. The reversing valve 323 may be actuated either by the manually operable control lever 324 or automatically in a manner to be hereinafter described. In the position of the reversing valve 323, fluid under pressure when admitted through the pipe 322 may pass through a pipe 325 to a flow control valve 326 which serves to delay the reversing of fluid to cause a dwell at the end of the reciprocatory stroke of the carriage 65. A throttle valve 328 (Fig. 3) serves to control the admission of fluid to the left-hand end chamber of the valve 326 to shift the valve toward the right against the compression of a spring 327. During the shifting movement of the valve 326 toward the right, fluid may pass from the pipe 325 through a valve chamber 329 and through a pipe 330 into the right-hand end chamber of a fluid pressure actuated reversing valve 332. A ball check valve 333 is provided to allow substantially unrestricted flow of fluid from the left-hand end of the valve 326 when the reversing valve is shifted so as to allow the release compression of the spring 327 to return the valve 326 to the position as illustrated in Fig. 3.

Similarly when the reversing valve is shifted into a reverse position, fluid may flow from the pipe 322, through the valve 323 and through a pipe 335 to a flow control valve 336. The valve 336 is normally held in a left-hand end position by a compression spring 337. A throttle valve 338 in the pipe line 335 controls the admission of fluid to the left-hand end chamber of the valve 336 to control the shifting movement of the valve 336 toward the right. During the shifting of the valve 336 toward the right, fluid may pass from the pipe 335 through a valve chamber 339 into a pipe 340 into a left-hand end chamber of the reversing valve 332. A ball check valve 343 is provided to allow substantially unrestricted exhaust of fluid from the left-hand end chamber of the valve 336 when the parts are in the position illustrated in Fig. 3.

It is desirable to provide a positive means of controlling the start-stop valve 320 and the reversing valve 323 from the upper control unit 162a. This is preferably accomplished by a hydraulically operated mechanism comprising a piston-type valve 370 which is held in a central position (Fig. 4) by means of a spring 371. A manually operable control lever 372 is provided for actuating the valve 370 so as to control the start-stop valve 320. Fluid under pressure from the pipe 138 enters a valve chamber 373 in the valve 370 and may be directed either through a pipe 374 or a pipe 375 to opposite ends of a cylinder 376. The cylinder 376 (Fig. 4) is provided with a piston 377 having a piston rod 378. As shown diagrammatically in Fig. 4 the piston rod 378 is provided with a pair of spaced adjustable collars or dogs 379 and 380 which are arranged to engage and actuate the control lever 321 so as to actuate the start-stop valve 320.

Similarly a piston-type valve 390 is provided on the upper control unit 162a. The valve 390 is provided with a centering spring 391, normally to hold the valve in a central or neutral position. A manually operable control lever is provided for shifting the valve 390 in either direction so that fluid under pressure passing through the pipe 138 into a valve chamber 393 may be directed either through a pipe 394 or a pipe 395 to opposite ends of a cylinder 396. The cylinder 396 is located on the front of the machine base and contains a slidably mounted piston 397. The piston 397 is connected to one end of a piston rod 398. As shown diagrammatically in Fig. 4, a pair of adjustably mounted collars or dogs 399 and 400 are mounted on the piston rod 398 and are arranged to actuate the control lever 324 to shift the reversing valve 323 when desired. It will be readily apparent from the foregoing disclosure that by manipulation of the control levers 372 and 392 on the upper control unit 162a the start-stop valve 320 and the reversing valve 323 may be readily and positively controlled and actuated.

Figure 10:
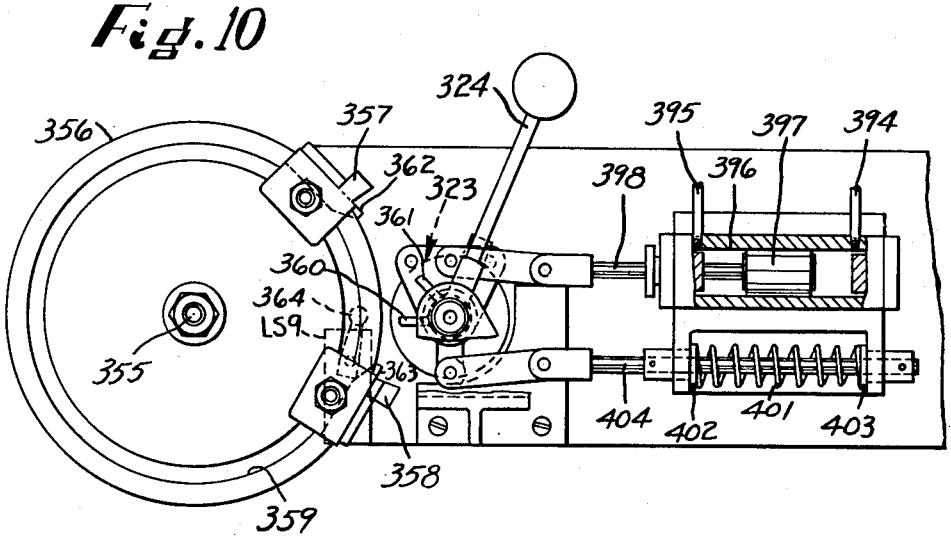
Fig. 10 is a fragmentary front elevation, partly in section on an enlarged scale, of the reversing control mechanism for the longitudinally movable carriage.
Figure 11:
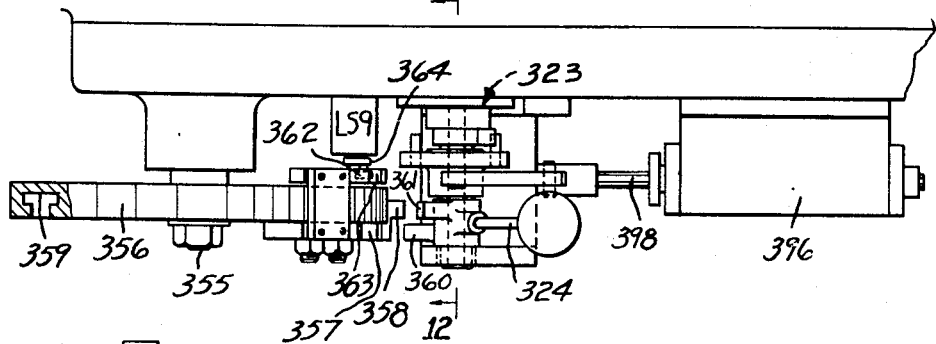
Fig. 11 is a plan view of the mechanism shown in Fig. 10.
Figure 12:
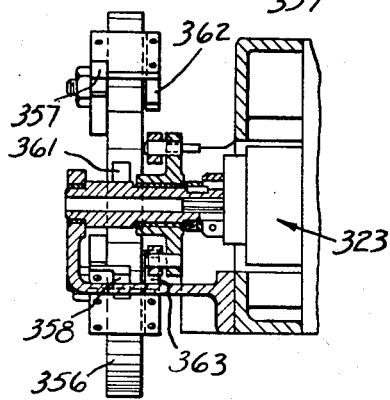
Fig. 12 is a fragmentary cross-sectional view, taken approximately on the line 12—12 of Fig. 11.

The construction shown diagrammatically in Fig. 4 provides balanced springs for centering the pistons 377 and 397 in their respective cylinders 376 and 396. As shown in Fig. 10 in actual construction, a spring 401 is provided for centering the piston 397. The spring 401 is located between a pair of sleeves 402 and 403 which are fixedly mounted on a slide rod 404. The slide rod 404 is operatively connected to shift the control lever 324 to reverse the position of the reversing valve 323. In actual construction, a similar centering spring mechanism is provided for centering the piston 377. Inasmuch as this mechanism is identical with that previously described, it has not been illustrated and described in detail.

The fluid actuated reversing valve 332 is a piston-type reversing valve comprising a slidably mounted valve member 344 which is normally held in a central or neutral position by a pair of compression springs 345 and 346 located within the end chambers 341 and 331 respectively. When the slidably mounted valve member 344 is shifted toward the left, fluid from the pressure pipe 138 may pass through the pipe 301 to the fluid motor 75 to cause the fluid motor to rotate in one direction to traverse the carriage 65. During this movement of the carriage 65 fluid may exhaust from the motor 75 through the pipe 302, through a central passage 347 in the slidably mounted valve member 344 and out through an exhaust pipe 410 to a speed control mechanism to be hereinafter described.

In order to control the length of the reciprocatory stroke of the carriage 65 a suitable reversing mechanism is provided to automatically change the direction of rotation of the motor 75 when the carriage 65 has traversed through a predetermined distance. As illustrated in Fig. 3, a worm 350 is mounted on the left-hand end of the feed screw 69. The worm 350 meshes with a worm gear 351 carried by a shaft 352. A gear 353 is also mounted on the shaft 352 and keyed to rotate with the worm gear 351. The gear 353 meshes with a gear 354 on a shaft 355. The shaft 355 also supports a circular plate 356 which is provided with a pair of adjustably mounted reversing dogs 357 and 358 which are adjustably clamped thereon in a circular T-slot 359. The dogs 357 and 358 are off-set relative to each other and are arranged to engage a pair of offset lugs 360 and 361 which are fixedly mounted relative to the reverse lever 324. The dogs 357 and 358 are provided with cams 362 and 363 respectively (Fig. 10) which are arranged to engage the actuating arm 364 of a limit switch LS9. The limit switch LS9 is operatively connected in a manner to be hereinafter described to impart an infeeding movement to the lower slide at the ends of the reciprocatory stroke of the carriage 65 as desired.

As shown in Fig. 3, the solenoid S6 is connected in series with one set of contactors of the limit switch LS9 and one set of contactors of the magnetic switches CR5 and CR7 so that a manual infeeding movement of the lower slide may be obtained either in a rearward or forward position by actuation of the limit switches PB1 and PB2.

In order to obtain an infeed of the lower slide automatically at the ends of the reciprocatory stroke of the carriage 65, the other set of contactors of the limit switch LS9 are connected in series with the electric timer 281 so that each actuation of the limit switch LS9 by either the cam 362 or the cam 363 will energize the timer 281 and through either the magnetic switch CR5 or CR7 cause an actuation of the valve 260 to produce an infeeding movement of the lower slide during reversal of the carriage 65.

The rate of the traversing or reciprocating movement of the carriage 65 is preferably regulated by the exhaust of fluid from the valve 332 through the exhaust pipe 410. As illustrated in Fig. 3 fluid exhausting from the valve 332 through the pipe 410 may pass through a truing speed throttle valve 411 and also through a control valve 405. The control valve 405 is a fluid actuated valve comprising a slidably mounted valve member 406 the position of which is controlled by a pilot valve 407. The pilot valve 407 is normally held in a right-hand end position by a compression spring. A solenoid S7 is provided which when energized serves to shift the pilot valve toward the left thereby admitting fluid under pressure into the left-hand end chamber of the valve 405 to shift the slidably mounted valve member 406 toward the right. In the position of the valve member 406, fluid exhausting through the pipe 410 may pass through a central passage 412 in the slidably mounted valve member 406 and pass therefrom through a grinding speed throttle valve 413 into the common exhaust pipe 188. In this position of the valve 405, the setting of the truing speed control valve 411 and the grinding speed control valve 313 governs the normal speed of travel of the carriage 65 during a grinding operation.

If a truing operation is to be performed, a very slow speed movement of the carriage 65 is desired. This is preferably obtained by an electrically controlled mechanism comprising a pair of pushbutton switches PB5 on the lower control unit 162 and PB3 on the upper control unit 162a. When either of the switches PB5 or PB3 is closed, a circuit is closed to energize a magnetic switch CR6 thereby energizing the solenoid S7 to shift the slidably mounted valve member 406 into the extreme right-hand end position thereby cutting off exhaust of fluid through the control valve 405 after which all fluid exhausting from the pipe 410 must pass through the truing speed control valve 411 which is adjusted for the desired slow traversing movement of the carriage 65 during a truing operation. A switch PB4 on the lower control unit 162 and a switch PB6 on the upper control unit 162a are provided to break a circuit and deenergize magnetic switch CR6 and solenoid S7 when a grinding traverse or reciprocation of the carriage 65 is desired.

It is desirable to provide a mechanism for moving the wheel spindle 90 in an axial direction to facilitate positioning the grinding wheels 91 and 92 and also for use as a wheel feeding mechanism as will be hereinafter described. The wheel spindle 90 (Fig. 21) is mounted in bearings 420 and 421 supported in the wheel head 88. A sleeve 422 is keyed onto the spindle 90. The sleeve 422 is provided with an annular groove 423 within which a ring-shaped member 424 is mounted. A yoke 425 is pivotally supported on a vertical shaft 426 (Fig. 22). The yoke 425 is provided with a pair of diametrically arranged studs 427 and 428. The studs 427 and 428 fit within diametrically arranged holes formed within the member 424. A manually operable control lever 429 (Fig. 22) is fixedly mounted on the upper end of a vertical rock shaft 430. The rock shaft 430 is mounted in a bearing 431 formed in the upper portion of the wheel head. The lower end of the rock shaft 430 is provided with a circular shaped head 432 having an eccentrically arranged pin 433 the lower end of which fits within a hole formed in a slide block 434. The slide block 434 slides within a groove 435 which is fixedly mounted relative to the yoke 425. It will be readily apparent from the foregoing disclosure that actuation of the control lever 429 in either direction will be transmitted through the crankpin 433 to swing the yoke 425 and thereby to move the spindle 90 axially within its supporting bearings 420 and 421. A pair of spring pressed plungers 436 and 437 (Figs. 21 and 22) frictionally engage a hub 438 of the control lever 429 to maintain the spindle 90 in adjusted position.

A suitable gauging apparatus is provided whereby the axial movement of the spindle 90 may be visibly determined to facilitate a precise axial movement of the spindle 90 and the grinding wheels 91 and 92. The yoke 425 is provided with a vertically arranged stud 440 which engages a U-shaped frame 441 which is arranged to slide longitudinally on a rod 442. A pair of compression springs 443 and 444 surround the rod 442 and are interposed between opposite sides of the U-shaped frame 441 and a pair of spaced bosses 438 and 439 formed integral with the wheel head 88. The U-shaped frame 441 is provided with a pair of oppositely extending aligned studs 445 and 446 which are arranged to engage a pair of actuating plungers 447 and 448 of a pair of dial indicators 449 and 450 respectively. It will be readily apparent from the foregoing disclosure that when the control lever 429 is moved to impart an axial motion to the spindle 90, the pin 440 will be moved by the yoke 425 and through the U-shaped frame 441 will impart an axial movement to the studs 445 and 446 to actuate the dial indicators 449 and 450. The dial indicators 449 and 450 are calibrated to give a precise reading of the amount of axial movement of the wheel spindle 90 within its bearings 420 and 421.

To facilitate an internal grinding operation, an internal grinding attachment 455 is provided which may be removably fastened to the front face of the wheel head 88. The attachment 455 is provided with a forwardly extending bracket 456 having a cylindrical aperture 457 arranged to receive an internal grinding wheel spindle cartridge of a standard well known variety. The internal grinding wheel spindle cartridge 458 is provided with a grinding wheel 459 which is arranged to perform an internal grinding operation when desired. The bracket 456 is provided with a slot 460 and a pair of binder screws 461 and 462 to facilitate clamping the cartridge 458 in an operative position on the attachment 455 and also to facilitate removing the cartridge therefrom when desired. The grinding wheel 459 is driven by a pulley 463 mounted on the right-hand end of an internal spindle 454. The pulley 463 is connected by a driving belt 464 with a pulley 465 mounted on a motor shaft 466 of an electric motor 467. The motor 467 is preferably mounted on a pivotally mounted motor platen 468 (Figs. 23 and 24) which is pivotally supported on a pair of spaced studs 469 and 470 carried by an upwardly extending portion of the attachment 455. An adjusting screw 471 is provided to facilitate adjustment of the platen 468 to tension the driving belt 464 as desired.

A swivel adjusting mechanism is provided for precisely swivelling the wheel head 88 relative to the upper slide 87 and also for swivelling the swivel plate 83 relative to the lower slide 82. A stud 480 is adjustably clamped to the upper slide 87 by means of a clamping bolt 481. The clamping bolt 481 is provided with an enlarged head 482 which slides within a circular T-slot 483 formed in the upper surface of the slide 87. The stud 480 passes through an elongated slot 484 formed in the wheel head 88 and may be clamped in adjusted position relative to the upper slide 87 by means of the clamping bolt 481. The wheel head 88 is provided with a pair of upwardly extending bosses 487 and 488 (Fig. 14) which serve as supports for a pair of opposed adjusting screws 487 and 488. The heads of the adjusting screws 487 and 488 are arranged to engage the periphery of the stud 480. A plurality of clamping bolts 489 and 490 (Fig. 1) are provided for clamping the wheel head 88 in adjusted position relative to the upper slide 87. When it is desired to adjust the wheel head 88 angularly relative to the upper slide 87, the clamping bolts 489 and 490 and also the clamping bolt 481 are loosened and the wheel head 88 is swivelled to the desired position. The swivel adjustment of the wheel head 88 is facilitated by a graduated scale 491 formed on the upper slide 87. The wheel head 88 is adjusted to approximately the desired location after which the clamping bolt 481 is tightened to clamp the screw 481 into a fixed relationship with the upper slide 87. The adjusting screws 487 and 488 may then be adjusted precisely to position the wheel head 88 relative to the upper slide 87 after which the clamping bolts 489 and 490 may be tightened to lock the wheel head 88 in the desired adjusted position relative to the upper slide 87.

An identical swivel adjusting mechanism 495 is provided on the swivel plate 83 to facilitate a precise swivelling adjustment of the wheel head 88, the upper slide 87, and the swivel plate 83 relative to the lower slide 82. This adjusting mechanism has not been illustrated in detail since it is identical with that shown in Figs. 14 and 15 previously described. By the provision of the two swivel adjustments, the path of movement of the upper slide 87 may be adjusted relative to the lower slide 82 and similarly the wheel head 88 may be swivelled relative to the upper slide 87 to facilitate setting up the machine for angular face grinding or shoulder grinding and the like.

The lower control unit 162 and the upper control unit 162a are provided with a plurality of pushbutton switches for controlling the various motors of the machine. A switch PB15 on the lower control unit 162 and a switch PB15a on the upper control unit 162a are provided for starting the internal grinding wheel spindle motor 467. Similarly a switch PB16 on the lower control unit 162 and a switch PB16a on the upper control unit 162a are provided for stopping the internal grinding wheel spindle motor 467.

A switch PB17 on the lower unit and a switch PB17a on the upper unit serve to start the external grinding wheel driving motor 93. A switch PB18 on the lower unit and a switch PB18a on the upper unit serve when actuated to stop the motor 93.

A switch PB19 on the lower unit and a switch PB19a on the upper unit serve to start a coolant supply motor (not shown) and a switch PB20 on the lower unit and a switch PB20a on the upper unit serve to stop the coolant drive motor.

A switch PB21 on the lower unit and a switch PB21a on the upper unit serve to start the work drive motor 25. A switch PB22 on the lower unit and a switch PB22a on the upper unit serve to stop the work drive motor 25. A switch PB23 on the lower unit and a switch PB23a on the upper unit serve when actuated to jog the work driving motor 25.

A switch PB24 on the lower unit and a switch PB24a on the upper unit serve as master stop switches whereby the entire operation of the machine may be readily stopped at any time during a grinding operation.

The feeding mechanisms for the lower slide 82 and the upper slide 87 previously described are remotely controlled by pushbuttons on the control panel 166 on the lower control unit 162 and the control panel 166a on the upper control unit 162a. By manipulation of the pushbutton switches the mechanisms for actuating the slides 82 and 87 are remotely controlled so that either a pick feed, a slow infeed, or a rapid infeed may be obtained. In certain grinding operations, it may be desirable to provide a mechanical feed whereby the movement of the grinding wheel 91 or 92 toward the work may be mechanically controlled. As illustrated in the drawings a tacking-type feed is employed. The swivel plate 83 may be swivelled relative to the lower slide 82 to change the normal position of the V-way 85 and flatway 86 so that instead of providing a transverse movement of the grinding wheel relative to the axis of the workpiece, a longitudinal movement thereof may be obtained by swivelling the plate 83 through 90° to position the wheel spindle 90 and the grinding wheel 91 as illustrated diagrammatically in dotted lines in Figure 26. In this position of the grinding wheel 91 actuation of the pushbuttons serves to cause the wheel spindle 90 to move longitudinally, that is in a direction normal to its axis of rotation to impart a feeding movement to the grinding wheel 91 to grind a side face 482 on a workpiece 481.

If a tacking-type of feed is desired, as illustrated diagrammatically in Fig. 25, the wheel head 88 may be swivelled relative to the upper slide 87 so that the axis of the grinding wheel spindle 90 is positioned as shown in full lines 90a in Fig. 25. With the wheel spindle in position 90a and grinding wheel 91 swivelled to position 91a, the periphery of the wheel is trued to provide a frusto-conical face the operative element of which is parallel to the axis of rotation of the workpiece 481. In this position of the wheel, an axial movement of the wheel spindle 90 within its supporting bearings 420 and 421 may be obtained by manipulation of the shoulder grinding attachment control lever 429. It will be readily apparent that when the lever 429 is moved, a corresponding movement will be imparted to the grinding wheel 91a to cause the operative face thereof to move into grinding engagement with the peripheral portion 480 of the workpiece 481 to grind the same to the desired and predetermined extent. By utilizing this tacking-type feed, a precise feeding movement of the grinding wheel may be obtained by direct mechanical connections with the control lever 429. If an extremely fine feed of the grinding wheel 91 is desired the wheel head 88 may be swivelled to a very slight angle from the normal position for example to approximately 3° in which case an axial movement of ten thousandths of an inch of the wheel spindle 90 within its supporting bearings will advance the operative face of the grinding wheel one thousandth of an inch. The extent of axial movement of the wheel spindle may be readily controlled by observation of the dial indicators 449 and 450. By varying the angular position of the wheel head 88 relative to the upper slide 87 any desired ratio between the axial movement of the wheel spindle 90 and the infeeding movement of the operative face of the grinding wheel 91 may be obtained.

As shown diagrammatically in Fig. 26 the tacking-type feed may be utilized for side face or shoulder grinding by swivelling the wheel head 88 or the swivel plate 83 to position the wheel spindle 90 in position 90a (Fig. 26), in which position the wheel spindle 90 may be moved axially within its bearing by manipulation of the control lever 429 to obtain the desired fine mechanical feeding of the grinding wheel 91. The angular position illustrated in Fig. 26 is somewhat exaggerated for purposes of illustration. If a fine tacking-type feeding movement is desired the angular relationship of the spindle 90 is preferably located at a very slight angle for example 3° in order that a relatively long movement of the spindle may be utilized to impart a relatively small feeding movement to the operative face of the grinding wheel 91.

The tacking-type of feed may be similarly utilized for face plate grinding operations in which a plane face 483 of a workpiece 484 to be ground is mounted on the face plate 55. The headstock 15 is then swivelled through 90° into the position illustrated diagrammatically in Fig. 27. The wheel head 88 or swivel plate 83 may then be swivelled to the desired angle after which the tacking-type feed may be obtained by manipulation of the shoulder grinding lever 429. The tacking-type feed is equally applicable to an internal grinding operation in which an internal cylindrical surface 485 of a workpiece 486 may be ground by mounting the workpiece 486 on the face plate 55. The wheel head 88 or the swivel plate 83 may then be swivelled through the desired angle and the periphery of the wheel trued to a frusto-conical shape after which a tacking-type feed may be obtained in a similar manner by manipulation of the shoulder grinding control lever 429.

The operation of the improved grinding machine will be readily apparent from the foregoing disclosure. The machine may be utilized for a traverse grinding operation in which a workpiece to be ground is mounted on the headstock center 20 and footstock center 21. The grinding wheel carriage 65 may be traversed longitudinally at a slow or a fast rate of speed by manipulation of the control element 165 on the front of the machine base or by the control element 165a on the carriage 65. If an automatically controlled reciprocation of the carriage is desired, the manually operable start-stop lever 321 may be actuated and the carriage 65 will be reciprocated longitudinally through a stroke governed by the reversing dogs 357 and 358.

The grinding wheels 91 and 92 may be fed either forward or rearward depending upon the type of grinding operation at a fast and slow speed by manipulation of the control member 163 on the lower control unit 162 and the control member 163a on the upper control unit 162a for controlling the feeding movement of the upper slide 87. If desired the lower slide may be fed either forward or rearward by manipulation of the control member 164 on the lower control unit 162 or the control member 164a on the upper control unit 162a, the forward or rearward feeding movement of the upper slide 87 and the lower slide 82 being determined by the setting of the selector switches SL2 and SL1 respectively.

If a face plate operation is desired, the headstock 15 may be swiveled through any desired angle up to 180° to position a workpiece mounted thereon in position for a grinding operation. The wheel head 88 may be swiveled relative to the upper slide 87 and the upper slide 87 may be swiveled relative to the lower slide 82 to facilitate the grinding of shouldered faces on a workpiece either by a direct transverse feeding movement or an angular feeding movement if desired. It will be readily apparent that the upper slide 87 may be swiveled through 90° so that the V-way 85 and flatway 86 are parallel with the ways of the carriage 65 to facilitate a longitudinal movement of the slide 87 and the wheel head 88 to feed the grinding wheels 91 and 92 into the workpiece to grind the same to the desired and predetermined extent. If a pick feed of the grinding wheels is desired, this may be obtained by manipulation of the pushbutton switches PB7 or PB8 to obtain a pick feed of the upper slide 87 or by manipulation of the pushbutton switches PB1 and PB2 to impart a pick feeding movement to the lower slide 82.

If desired a tacking-type feed may be employed whereby the wheel head 88 may be set at an angular relation with the axis of the workpiece being ground, the grinding wheel face trued to a frusto-conical shape and the feeding movement obtained by manipulation of the manually operable lever 429 to cause an axial feeding movement of the grinding wheel spindle 90 within its bearings 420 and 421 to produce a fine feeding movement of the grinding wheel into the workpiece. This tacking-type wheel feed may be employed for a wide variety of grinding operations such as shown in Figs. 25, 26, 27 and 28.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a base, a grinding wheel head adjustably mounted thereon, precise adjusting mechanism to swivel said head in a horizontal plane, a rotatable grinding wheel spindle, spaced bearings on said head to support said spindle, said spindle being arranged for an axial movement within said bearings, a grinding wheel on said spindle having a frusto-conical operative face, the operative element of said face being parallel with an element of the surface to be ground, and a manually operable mechanism to impart an axial feeding movement of the wheel spindle within its bearings to produce a precise feeding movement to the grinding wheel.

2. In a grinding machine having a base, a grinding wheel head adjustably mounted thereon, precise adjusting mechanism to swivel said head in a horizontal plane, a rotatable grinding wheel spindle, spaced bearings on said head to support said spindle, said spindle being arranged for an axial movement within said bearings, a grinding wheel on said spindle having a frusto-conical operative face, the operative element of said face being parallel with an element of the surface to be ground, and a manually operable mechanism to impart an axial feeding movement of the wheel spindle within its bearings to produce a precise feeding movement to the grinding wheel, said parts being arranged so that a relatively long movement of the wheel spindle imparts a relatively small transverse feeding movement to the grinding wheel.

3. In a grinding machine having a base, a transversely movable slide thereon, means to feed said slide transversely, a grinding wheel head pivotally supported thereon for swiveling in a horizontal plane, a rotatable wheel spindle, spaced bearings on said wheel head rotatably to support said spindle, said wheel spindle being arranged for an axial movement within said bearings, means precisely to indicate the position of said spindle, precise adjusting mechanism interposed between the slide and wheel head to facilitate adjusting the wheel head to a predetermined angular position, a grinding wheel on said spindle having a frusto-conical operative face the operative elements of which are parallel to the surface to be ground, and manually operable means to traverse said spindle axially within the supporting bearings to impart a fine feeding movement to said grinding wheel.

4. In a grinding machine having a base, a transversely movable slide thereon, means to feed said slide transversely, a grinding wheel head pivotally supported thereon for swivelling in a horizontal plane, a vertical pivot stud therefor, a rotatable wheel spindle, spaced bearings on said wheel head rotatably to support said spindle, said wheel spindle being arranged for an axial movement within said bearings, means including an indicator precisely to indicate the position of said spindle, precise adjusting mechanism interposed between the slide and wheel head to facilitate adjusting the wheel head to a predetermined angular position, a grinding wheel on said spindle having an angular operative face the operative element of which is parallel to the surface to be ground, and manually operable means to traverse said spindle axially within the supporting bearings to impart a fine feeding movement to said grinding wheel.

HERBERT A. SILVEN.

No references cited.